US010627899B2

(12) United States Patent
Price et al.

(10) Patent No.: US 10,627,899 B2
(45) Date of Patent: Apr. 21, 2020

(54) EYE TRACKING SYSTEM FOR USE IN A VISIBLE LIGHT DISPLAY DEVICE

(71) Applicant: MICROSOFT TECHNOLOGY LICENSING, LLC, Redmond, WA (US)

(72) Inventors: Raymond Kirk Price, Redmond, WA (US); Kai Zang, Redmond, WA (US); Gregory Theodore Gibson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 15/893,352

(22) Filed: Feb. 9, 2018

(65) Prior Publication Data
US 2019/0250704 A1     Aug. 15, 2019

(51) Int. Cl.
*G06F 3/01*    (2006.01)
*G06F 1/3234*  (2019.01)

(52) U.S. Cl.
CPC .............. *G06F 3/013* (2013.01); *G06F 1/325* (2013.01); *G06F 1/3265* (2013.01)

(58) Field of Classification Search
CPC .. G02B 27/16; G02B 27/2214; G02B 27/225; G02B 27/24; G06F 3/013
See application file for complete search history.

(56) References Cited

U.S. PATENT DOCUMENTS

| | | | |
|---|---|---|---|
| 9,674,436 B2* | 6/2017 | Crane | G06F 3/013 |
| 10,311,584 B1* | 6/2019 | Hall | G06T 7/251 |
| 2005/0255716 A1 | 11/2005 | Tanaka et al. | |
| 2011/0050885 A1* | 3/2011 | McEldowney | G06K 9/2036 348/135 |
| 2012/0105310 A1* | 5/2012 | Sverdrup | G02B 27/017 345/8 |
| 2012/0206334 A1 | 8/2012 | Osterhout et al. | |
| 2015/0057557 A1* | 2/2015 | Howie | G16H 50/30 600/509 |
| 2016/0202117 A1* | 7/2016 | Hosking | G01J 1/44 250/252.1 |
| 2016/0248971 A1 | 8/2016 | Tall et al. | |
| 2016/0349516 A1 | 12/2016 | Alexander et al. | |
| 2017/0188822 A1 | 7/2017 | Yang | |
| 2017/0285343 A1* | 10/2017 | Belenkii | G02B 27/0172 |

(Continued)

FOREIGN PATENT DOCUMENTS

WO    2016174659 A1    11/2016

OTHER PUBLICATIONS

"Silicon photomultiplier—Wikipedia", Retrieved From https://web.archive.org/web/20170327123426/https://en.wikipedia.org/wiki/Silicon_photomultiplier, Mar. 27, 2017, 2 Pages.

(Continued)

*Primary Examiner* — Olga V Merkoulova
(74) *Attorney, Agent, or Firm* — Workman Nydegger

(57) ABSTRACT

Eye tracking system for use in a visible light display device incorporates and/or use one or more silicon photomultiplier (SiPM) sensor and an infrared module of a microelectromechanical (MEMs)-based scanner. The infrared module emits a beam of photons, where at least some of the photons are directed towards a user's eye while the eye tracking system is being used. The SiPM sensor(s) capture a reflection that emanates off of the user's eye.

19 Claims, 18 Drawing Sheets

(56) References Cited

U.S. PATENT DOCUMENTS

| | | |
|---|---|---|
| 2018/0018917 A1 | 1/2018 | Yoo et al. |
| 2018/0033405 A1 | 2/2018 | Tall et al. |
| 2018/0045816 A1* | 2/2018 | Jarosinski ............ G01S 7/4814 |
| 2018/0149874 A1 | 5/2018 | Aleem et al. |
| 2018/0164412 A1 | 6/2018 | Gnecchi et al. |
| 2018/0165878 A1 | 6/2018 | Khan et al. |
| 2018/0259625 A1 | 9/2018 | Gnecchi et al. |
| 2018/0284884 A1 | 10/2018 | Sulai et al. |
| 2019/0094361 A1 | 3/2019 | Onal et al. |
| 2019/0120967 A1 | 4/2019 | Smits |
| 2019/0158819 A1 | 5/2019 | Hong et al. |
| 2019/0250703 A1* | 8/2019 | Price ..................... G01J 1/0437 |

OTHER PUBLICATIONS

"Non Final Office Action Issued in U.S. Appl. No. 15/893,320", dated Jul. 12, 2019, 22 Pages.

"International Search Report & Written Opinion Issued in PCT Patent Application No. PCT/US19/015052", dated Jun. 19, 2019, 18 Pages.

U.S. Appl. No. 15/582,353, filed Apr. 28, 2017, Gibson et al.

U.S. Appl. No. 15/893,320, filed Feb. 9, 2018, Price et al.

"Wideband Fixed-Gain Amplifier", Retrieved from: <<http://www.ti.com/lit/ds/symlink/ths4303.pdf>>, Nov. 2003, 31 Pages.

"International Search Report and Written Opinion Issued in PCT Patent Application No. PCT/US2019/015053", dated Jul. 2, 2019, 17 Pages.

"Notice of Allowance Issued in U.S. Appl. No. 15/893,320", dated Sep. 23, 2019, 10 Pages.

\* cited by examiner

EYE TRACKING SYSTEM FOR USE IN A VISIBLE LIGHT DISPLAY DEVICE

RELATED APPLICATIONS

This application is related to co-pending U.S. patent application Ser. No. 15/893,320, filed on Feb. 9, 2018, entitled "EFFICIENT MEMS-BASED EYE TRACKING SYSTEM WITH A SILICON PHOTOMULTIPLIER SENSOR," and which application is expressly incorporated herein by reference in its entirety

BACKGROUND

Mixed-reality systems, including virtual-reality and augmented-reality systems, have recently received significant interest for their ability to create immersive experiences for users. Conventional augmented-reality (AR) systems create an augmented reality scenario by generating holograms that are rendered in the user's line of sight to objects in the real world. In contrast, conventional virtual-reality (VR) systems create a more immersive experience because a user's entire view is obstructed by a virtual world.

As used herein, AR and VR systems are described and referenced interchangeably using the umbrella term "mixed-reality system(s)." Unless specifically stated or unless specifically required, as understood by one of skill in the art, the descriptions herein apply equally to any and all types of mixed-reality systems, including AR systems, VR systems, and/or any other similar system capable of displaying virtual objects to a user. Accordingly, from this point forward, the disclosure will use the term mixed-reality system to describe any of the systems referenced above.

Of note, many mixed-reality systems use one or more on-body devices, such as a head-mounted display (hereinafter "HMD"), to render a virtual environment for a user. Continued advances in hardware capabilities and rendering technologies have greatly increased the realism of virtual objects displayed within a mixed-reality environments, particularly with the use of HMDs. For example, as the user moves their head during a mixed-reality session, the rendered mixed-reality environment is automatically updated so that the user is provided with a proper perspective and view of the virtual objects in the mixed-reality environment.

Recent advances in this technology space relate to the use of eye tracking systems to track a movement of the user's eyes. As a result, a mixed-reality system can respond not only to a user's bodily movements, but it can also respond to a user's eye movements.

However, these new eye tracking technologies are available, they are seriously lacking. In particular, the current technology is quite costly because it often requires additional hardware (e.g., specialized cameras) on the HMD to capture the user's eye movements. Additionally, these cameras are placed in close proximity to the eyes and typically obstruct the user's field of view. Furthermore, the current technology is deficient because it consumes a large amount of battery resources. As a result, there is a significant need to improve the eye tracking technology used in HMDs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments include eye-tracking systems and methods, such as, but not limited to low resolution and low power microelectromechanical (MEMs)-based eye tracking systems and methods of use, which incorporate silicon photomultiplier (SiPM) sensors. This MEMs-based eye tracker may be optionally integrated with visible light MEMS-based display systems. Furthermore, in some implementations, a HMD eye tracking device is integrated into the display and provides no additional visual obstruction to the user.

Some disclosed embodiments include eye tracking systems that includes an infrared module and one or more SiPMs. Initially, the infrared module emits laser light (e.g., a light wave consisting of a beam of photons). At least part of this laser light (e.g., at least some photons) is directed towards the user's eye while the eye tracking system is being used. After the laser light is directed towards the user's eye, then the SiPMs capture a resulting reflection. To clarify, the reflection occurs as a result of the laser light initially striking and then reflecting off of the user's eye. As the laser light is rastered across the eye, the reflected signal from each laser position is received by the SiPM and can be used to generate a greyscale image of the eye. Because the SiPMs are positioned relative to the infrared module and to the user's eye, they are able to adequately capture this reflected signal. Once this reflection is captured, then the user's eye position is determined.

In some embodiments, an eye tracking system is used to perform an initial scanning of infrared light, such as with a MEMs mirrors system. This infrared light is then directed towards an eye of a user who is using the eye tracking system. Subsequently, a reflection of the infrared light is captured using one or more SiPMs. Of note, this reflection is generated as a result of the infrared light being directed towards and reflected off of the user's eye. Thereafter, an electrical response of the SiPMs is measured, and an image of the user's eye is generated using the electrical response. As multiple eye images are generated, which indicate a position of the eye at a specific point in time, it is possible to track the user's relative eye movements by comparing the eye images with each other to determine a delta displacement of the eye between each of the multiple images.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the embodiments may be realized and obtained by means of the instruments and combinations particularly pointed out in the appended claims. Features of the present embodiments will become more fully apparent from the following description and appended claims, or may be learned by the practice of the embodiments as set forth hereinafter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some of the embodiments described herein incorporate a low resolution and low power microelectromechanical (MEMs)-based eye tracking system that uses a silicon photomultiplier (SiPM) sensor.

The disclosed embodiments can be used to perform eye tracking. This eye tracking can be performed for the user's left eye, the user's right eye, or a combination of the user's left and right eyes. Therefore, the embodiments are not limited to tracking only a single eye. For brevity, however, the disclosure will (from this point forward) present examples related to only a single eye. These examples are for illustrative purposes only, and it will be appreciated that the principles may equally be applied to scenarios involving more than one eye.

The disclosed embodiments may be implemented to overcome many of the technical difficulties and computational expenses associated with tracking a user's eye. As one example, the disclosed embodiments greatly improve the eye tracking technology because fewer hardware resources are required. To illustrate, the conventional technology often requires additional and/or specialized eye tracking cameras. As a result, the conventional eye tracking technology increases the amount of hardware on the HMD. Such hardware consumes more battery resources and places more weight on the user's head. Additionally, this hardware often obscures a portion of the user's field of view. In contrast, the disclosed embodiments significantly reduce the battery expenditure, the production costs, the weight factor because less hardware is used, and can be integrated with the visible light display system of scanning MEMS systems. For these reasons, the disclosed embodiments actually improve the functionalities and operations of a computer system.

The disclosed embodiments may be used to perform iris authentication based on patterns detected from or generated from the disclosed eye tracking systems as well as generalized eye tracking for understanding the user's gaze, attention, or intent.

Figure 1:
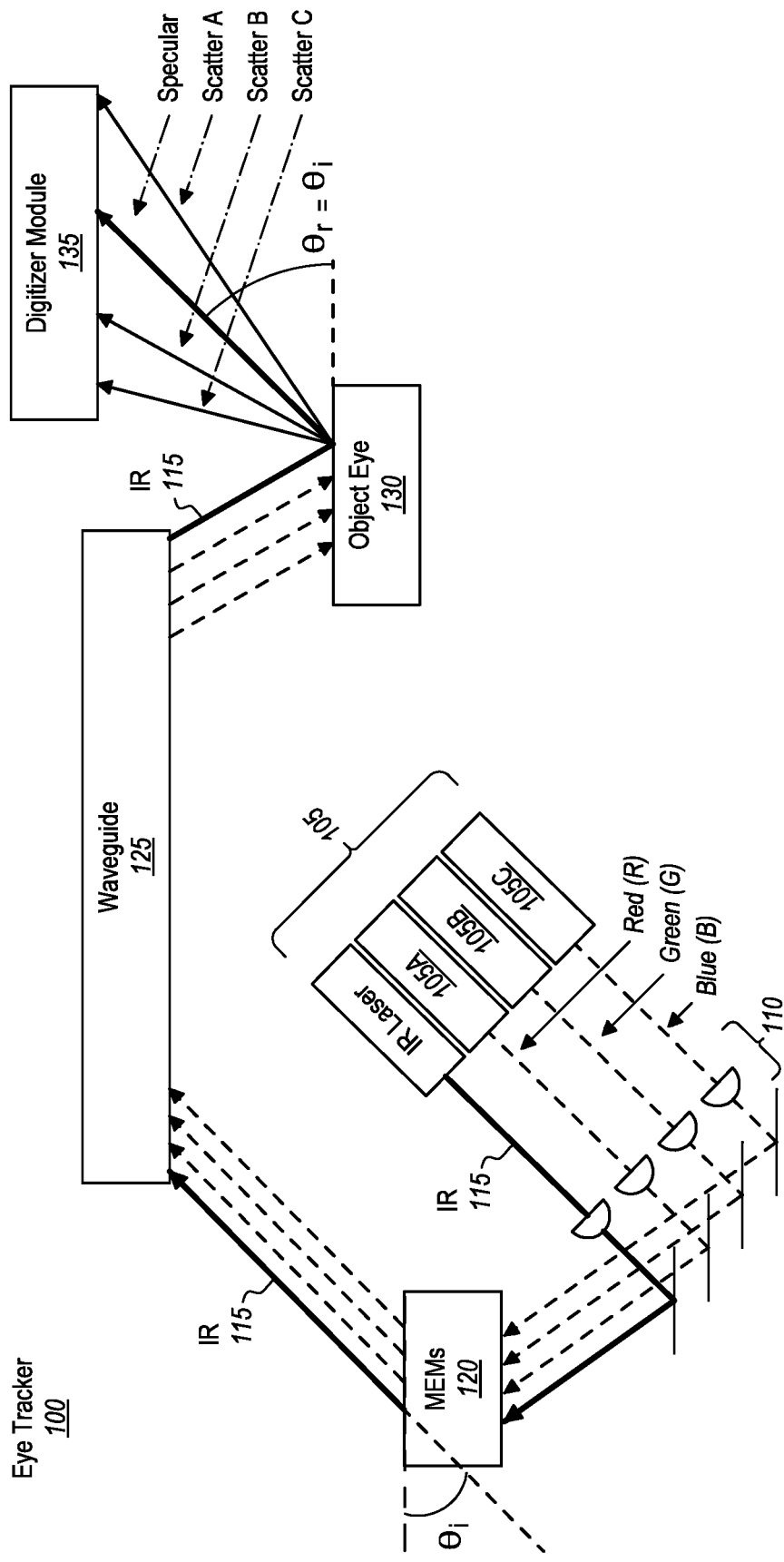
FIG. 1 shows an example architecture for providing a low resolution and lower power microelectromechanical (MEMS)-based eye tracking system that includes a silicon photomultiplier (SiPM) sensor.

Having just described various high-level attributes and advantages of some of the disclosed embodiments, the disclosure will now focus on FIG. 1 which presents an example architecture that may be used to practice the principles disclosed herein. Following that subject matter, the disclosure will focus on FIGS. 2 through 11C. In particular, these figures illustrate various architectures and supporting illustrations that demonstrate multiple embodiments that provide low resolution and low power MEMs-based eye tracking using a silicon photomultiplier (SiPM) sensor. After those figures, the disclosure will turn to FIG. 12 which introduces an example computer system that may be used to practice the disclosed principles. Finally, FIG. 13 will be presented, which figure illustrates an example method for performing eye tracking.

Example Architecture(s)

FIG. 1 shows an eye tracker system 100 that includes multiple lasers 105. To illustrate, the lasers 105 include, but are not limited to, an infrared (IR) laser and lasers 105A, 105B, and 105C. These lasers 105 are configured to emit "laser light." By "laser light," it is meant that the lasers 105 are able to emit a light wave having a determined wavelength and consisting of a beam of photons. Therefore, as used herein, the terms "laser light," "light wave," and "beam of photons" are interchangeable terms.

Turning first to the IR laser, the IR laser may be a fast modulating laser diode that emits an infrared light wave. An infrared light wave has a wavelength that extends from 700 nanometers (nm) up to 1000 nm. In contrast, the lasers 105A, 105B, and 105C are lasers that emit light waves having other wavelengths.

As an example, the laser 105A may be a laser diode that emits a red light wave having a wavelength extending between the range of about 630 nm up to about 700 nm. The laser 105B may be a laser diode that emits a green light wave having a wavelength extending between the range of about 500 nm up to about 535 nm. Finally, the laser 105C may be a laser diode that emits a blue light wave having a wavelength extending between the range of about 430 nm up to about 465 nm. Therefore, the eye tracker system 100 may include RGB (Red, Green, Blue) laser diodes as described above. Other spectrums of light may also be used for the RGB lasers, utilizing different ranges than those specified above.

Although FIG. 1 shows the lasers 105 as separate diode units, the embodiments are not limited solely to such a configuration. For instance, the lasers 105A, 105B, and 105C may be embodied as an integrated diode unit as opposed to three separate diode units. This integrated diode unit may also operate in combination with a separate IR laser.

Alternatively, all of the lasers 105 (i.e. the IR laser, laser 105A, laser 105B, and laser 105C) may be embodied within a single integrated diode unit, with or without the IR laser. Here, this single integrated diode unit is able to dynamically adjust its wavelength setting to thereby change the wavelength of the light wave that it is emitting. Accordingly, from this portion of the disclosure, it is evident that the lasers 105 may be embodied in various different forms.

To continue, FIG. 1 also shows that the lasers 105 are each emitting laser light. In the scenario presented in FIG. 1, each of the laser lights initially passes through a collimating optic (e.g., the collimators 110). By way of introduction, a collimator is a type of lens that reduces the divergence angle of the highly divergent light emitted by the laser diodes. When this occurs, the rays of the light wave become more parallel and/or aligned with each other.

FIG. 1 shows that the eye tracker system 100 includes a collimator for each emitted light wave. As a result, the collimators 110 narrow each of the emitted light waves. In situations where there is only a single emitted light wave, only a single collimator will be used. Accordingly, in some embodiments, the number of collimators 110 may correspond to the number of emitted light waves.

Alternatively, a single collimator may be used to narrow multiple light waves at the same time. To clarify, in some embodiments, the four collimators 110 shown in FIG. 1 may actually be replaced by a single collimator. Here, this single collimator will be structured to receive and narrow multiple light waves simultaneously. Using FIG. 1 as an example, a single collimator may be used to simultaneously narrow the four light waves that are emitted by the IR laser, the laser 105A, the laser 105B, and the laser 105C.

The light wave being emitted from the IR laser is labeled as infrared light wave 115. Similarly, the light waves being emitted from the lasers 105A, 105B, and 105C are labeled as Red (R), Green (G), and Blue (B) respectively. As shown, the infrared light wave 115 is presented in a dark bold format to emphasize its particular relevance with regard to the examples that are discussed throughout the remaining portion of this disclosure. By way of a brief introduction, the remaining examples focus on the use of the infrared light wave 115 to track the user's eye. Although the remaining examples focus on the use of an infrared light wave to track a user's eye, the embodiments are not strictly limited to using only an infrared light wave.

To clarify, any of the other light waves may also be used to track the user's eye. For instance, the red laser light, the green laser light, the blue laser, or various combinations of the infrared laser light, the red laser light, the green laser light, and/or the blue laser light may also be used to track the user's eye. For brevity, however, the remaining portion of this disclosure focuses on the use of the infrared light wave 115 to track the user's eye. To reiterate once more, the embodiments are able to track the user's eye using a light wave having any wavelength. They are not limited simply to using of an infrared light wave.

Returning to FIG. 1, the eye tracker system 100 is integrated with a microelectromechanical (MEMs)-based scanner 120. Although the lasers 105 are shown as individual components, it will be appreciated that the lasers 105 may also be considered to be a part of the MEMs-based scanner 120. Accordingly, the eye tracker system 100 is able to utilize an output of the MEMs-based scanner 120 in order to track the user's eye. In this manner, the eye tracking functionality is integrated with the HMD's display functionality (e.g., the MEMs-based scanner 120). Accordingly, the eye tracker system 100 is able to use many existing hardware components and thus reduce the amount hardware used to track a user's eye.

By way of introduction, the MEMs-based scanner 120 (i.e., a MEMs mirrors system) is used to scan the rendered pixels of an application using the RGB light that is emitted from the lasers 105A, 105B, and 105C. This light is scanned from those lasers across a region of the user's eye. Through this scanning operation, the MEMs-based scanner 120 is able to render an image that is viewable to the user. As shown in FIG. 1, the embodiments are also able to receive RGB light concurrently with infrared light (which may be subsampled as described in more detail later) and then scan the RGB light to render one or more display frames.

To that end, the MEMs-based scanner 120 may include a set of oscillating mirrors. One or more mirrors in the set can harmonically oscillate in a first direction in order to rapidly scan light in that first direction. While those mirrors are oscillating in the first direction, one or more other mirrors can scan more slowly in a second direction that is orthogonal to the first direction. Other embodiments of the MEMs-based scanner 120 may include only a single mirror that scans the image to the user's eye. Regardless of how it is implemented, the MEMs-based scanner 120 utilizes various optics to scan the RGB light emitted from the RGB lasers so that a rendered image is viewable for the user.

At this point, it is worthwhile to note that the system display requirements/settings for the scanned image generated by the MEMs-based scanner 120 are very different from the requirements/settings of the eye tracker system 100, as shown by the content included below in Table 1. Initially, it is noted that a digitizer module (to be discussed later) is used to generate an image of a user's eye. By generating multiple eye images across a time period, then the disclosed embodiments are able to detect how the eye moves. In this manner, each image corresponds to a position of the user's eye at a specific point in time. Further, the embodiments are able to use the MEMs-based scanner 120 to modify its scan so as to render one or more display frames in accordance with the eye's current position. In this manner, these display frames may (1) include and/or respond to the eye's position and (2) include a display resolution that is relative to the user's eye position (e.g., to perform foveated rendering). To clarify, in some instances, scanning the RGB light to a target display includes foveated scanning/rendering.

With that understanding, it is noted that the resolution of the eye images used for eye tracking can be significantly smaller (e.g., 16 times smaller) than the resolution of the display images used for image rendering by the MEMs-based scanner 120. Thus, the effective fill factor for the eye tracking image is but a fraction of the display's fill factor (e.g., Table 1 shows the effective fill factor of the eye tracker system 100 is only 6% as compared to 100% for the display settings). Because of this resolution disparity, the embodiments are configured to generate a "subsampled" light wave (e.g., subsampled infrared light).

TABLE 1

|  | Units | Example Display Settings | Example Eye Tracking Setting |
|---|---|---|---|
| Horizontal Resolution | Pix | 1920 | 320 |
| Vertical Resolution | Pix | 1280 | 240 |
| Operating Wavelength | nm | 450, 520, 639 | 850, 905, or 940 |
| Frame Rate | Hz | >90 | >90 |
| Equivalent Pixel Duration | % | 5.5 | 37.5 |
| Effective Fill Factor of The Display | % | 100 | ~6 |
| Estimated Illumination Power Savings By Operating In Pulsed Mode | % | NA | >85% |

To clarify, because of the substantially reduced eye tracking resolution requirements, the embodiments are able to cause one or more of the lasers 105 to completely turn off during unused horizontal scan lines and/or to pulse laser output only when actively imaging a pixel. Therefore, the process of generating subsampled infrared light includes turning off the IR laser during unused horizontal scan lines and/or pulsing the IR laser's output (i.e. the infrared light wave 115).

As indicated by Table 1, the disclosed embodiments are able to provide a low power and low-resolution eye tracking system (e.g., the embodiments can achieve at least 85% power savings and operate using significantly lower resolution eye images). Accordingly, the resolution of the images used for tracking a user's eye need not be the same as the resolution of the scanned content.

With that understanding, some of the disclosed embodiments generate subsampled light waves (e.g., subsampled infrared light) and use these subsampled light waves to generate lower resolution images of the user's eye, which images are used to track the user's eye. Because the embodiments operate using a lower resolution eye image, the embodiments significantly reduce the amount of consumed power.

As shown in FIG. 1, the eye tracking system 100 may also include a waveguide 125. A waveguide is a device that confines a light wave's propagation so that the light wave transmits only in a certain direction. Waveguides are useful because even though they restrict a light wave so that it travels only in a certain direction, the light wave does not lose significant image quality because of how the waveguide is structured. To perform this action, a waveguide may use diffractive optical elements to couple light into the waveguide, total internal reflection to transmit the signal light to the display portion of the waveguide, and a diffractive optical element to outcouple the light towards the user's eyes.

Accordingly, in some embodiments, the laser light from the lasers 105 (i.e. the RGB light and/or the infrared light) is delivered from the MEMs-based scanner 120 to an object/eye 130 via this waveguide 125. In particular, FIG. 1 shows that the MEMs-based scanner 120 delivers the infrared light wave 115 (which may be a subsampled light wave) to the waveguide 125 at an incident angle $\theta_i$. Notably, because the MEMs-based scanner 120 includes mirrors that oscillate in various different directions, $\theta_i$ will not be a constant angle. Instead, this angle will change in order to properly scan an image onto the user's eye.

Additionally, the waveguide 125 may also be used to project both the RGB light and the subsampled infrared light onto the user's eye, as shown in FIG. 1. To clarify, in the scenario presented in FIG. 1, the infrared light wave 115 is a subsampled light wave that is being scanned by the MEMs-based scanner 120 simultaneously with the RGB light. This RGB light and/or the subsampled infrared light wave 115 is then directed to the user's eye (e.g., the object/eye 130) via the waveguide 125.

Alternatively to using the waveguide 125, some embodiments use a partially transparent mirror that is positioned in front of the user's eye to direct the scanned light onto the eye. Regardless of which implementation is used, the scanned light may be directed to the user's eye without placing a scanning system immediately in front of the user's eye (which would result in obstructing the user's view).

Here, it will be appreciated that the object/eye 130 may be any object, and it is not limited solely to an eye. In the context of the eye tracker system 100, the object/eye 130 is the user's eye(s). However, in other contexts, the object/eye 130 can be a reflective object other than an eye.

Once the subsampled infrared light wave 115 strikes the object/eye 130, then specular and diffuse reflections (as used herein, "scatter" and "diffuse" are interchangeable terms) will be generated. For example, a specular reflection (labeled as "Specular" in FIG. 1) and one or more scatter reflections (labeled as "Scatter A," "Scatter B," and "Scatter C") will be generated. A specular reflection corresponds to the "glint" of the user's eye, while the scatter reflections correspond to the user's iris information. As a result, these reflections can also be used to authenticate the user's iris.

Figure 2B:
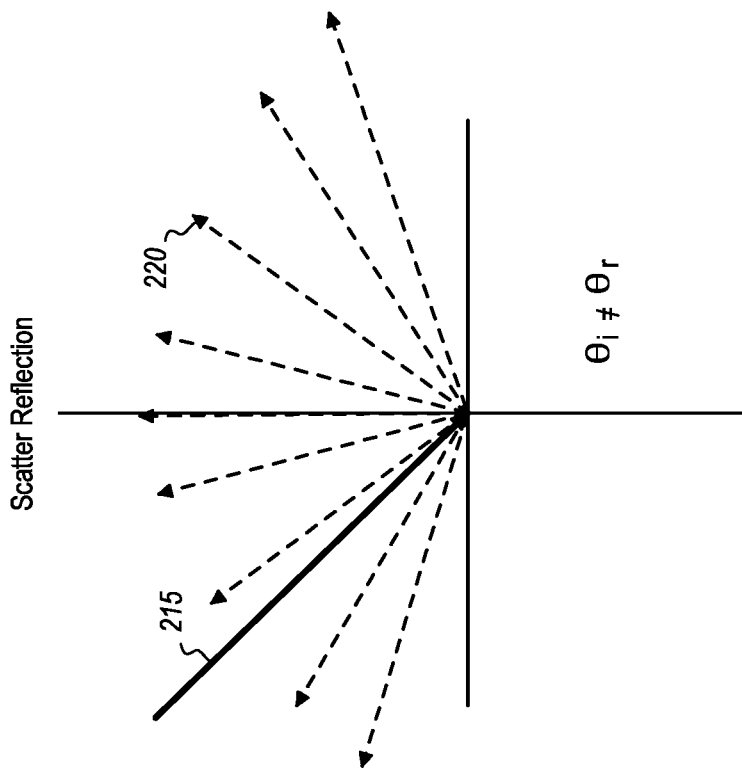
FIGS. 2A and 2B demonstrate the differences between a specular reflection and a scatter reflection.
Figure 2A:
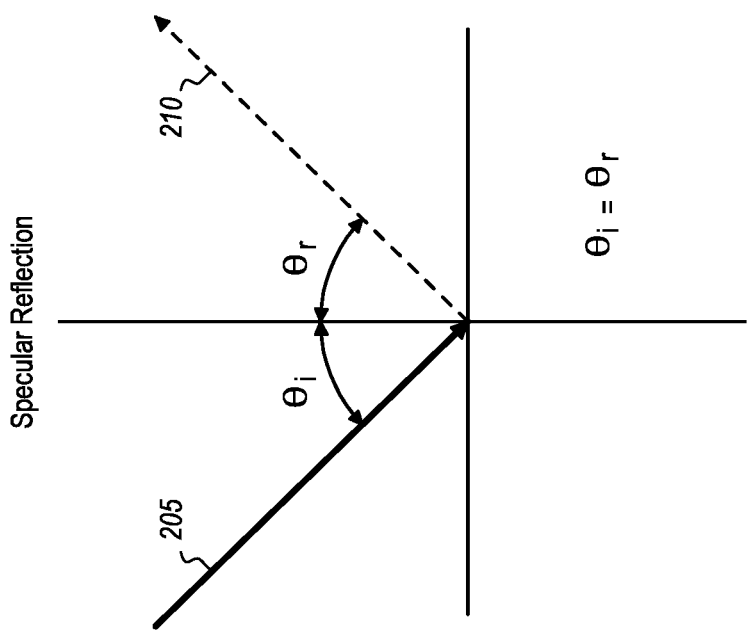

Turning briefly to FIGS. 2A and 2B, these figures demonstrate the differences between a specular reflection and a scatter (aka "diffuse" reflection). As shown in FIG. 2A, an incident ray of light 205 may strike a surface (e.g., an eye) at an incident angle $\theta_i$. When a specular reflection occurs, then the reflected ray of light 210 will have an angle of reflection $\theta_r$ that is the same as $\theta_i$. In other words, $\theta_i = \theta_r$ for a specular reflection.

In contrast, FIG. 2B shows a scatter reflection scenario. Here, the incident ray of light 215 is striking a surface at an incident angle (not labeled). Due to the properties of the surface, however, multiple scattered reflections may be generated, where each scattered reflection has a reflection angle that is different than the incident angle. In other words, $\theta_i \neq \theta_r$ for each of the scattered reflections. One of the multiple possible scattered reflections is labeled as scatter reflection 220.

Typically, the intensity of a specular reflection will be higher than the intensity of any of the scatter reflections. This aspect will be discussed in more detail later. Furthermore, it will be appreciated that a combination of both a specular reflection and multiple scatter reflections may occur simultaneously.

Returning to FIG. 1, the subsampled infrared light wave 115 is reflected, after striking the object/eye 130, in such a manner so as to create a specular reflection and multiple scatter reflections. As discussed earlier, the reflection angle $\theta_r$ for the specular reflection is equal to the incident angle $\theta_i$ of the infrared light wave 115. Notably, the reflection angle $\theta_r$ also corresponds to the incident angle $\theta_i$ that the infrared light wave 115 left the MEMs-based scanner 120. This reflection angle will also change in accordance with the oscillations of the mirrors in the MEMs-based scanner 120.

FIG. 1 also shows that the intensity of the specular reflection is higher than the intensity of the diffuse/scattered reflected infrared light waves (i.e. the Specular line is bolder than the Scatter A, Scatter B, and Scatter C lines) as a result of the reflected diffuse/scattered light waves (i.e. Scatter A, Scatter B, and Scatter C) spreading over a larger angular subtense. This is shown by the line bold weights. Although FIG. 1 shows only three scatter reflections, it will be appreciated that any number of diffuse/scatter reflections may be generated. Again, it is worthwhile to mention that due to the potential for low optical to optical efficiency of some waveguide displays, and as a result of the diffuse reflected light being scattered over a large angular subtense, the overall signal power and total number of photons presented to the SiPM detector may be very small.

Once the specular and the scatter reflections are generated, then at least some of these reflections will be captured by a digitizer module 135. This digitizer module 135 may be configured in various different ways, as described later. However, regardless of how it is implemented, the digitizer module 135 is structured to capture some of the reflections that emanate off of the user's eye as a result of the infrared light wave 115 (which may be subsampled) being directed onto the user's eye. Some embodiments of the digitizer module 135 capture the reflected light (e.g., the photons) through the use of one or more silicon photomultiplier (SiPM) sensors.

By way of introduction, a SiPM sensor is a type of photodiode sensor that generates an electrical response as a result of detecting light (e.g., a photon). This electrical response can be used to measure and characterize the detected light. More detail on SiPMs will be presented below.

The digitizer module 135 is used to capture the specular and scatter reflections from the user's eye and to generate an electrical response. This electrical response is converted into a digital signal. Additional processing is performed on the digital signal in order to generate an image of the user's eye which includes position information for that eye. Therefore, as multiple eye images are generated, the user's eye position and movements are detected, by measuring the delta displacements of the eye across the multiple images.

Figure 3:
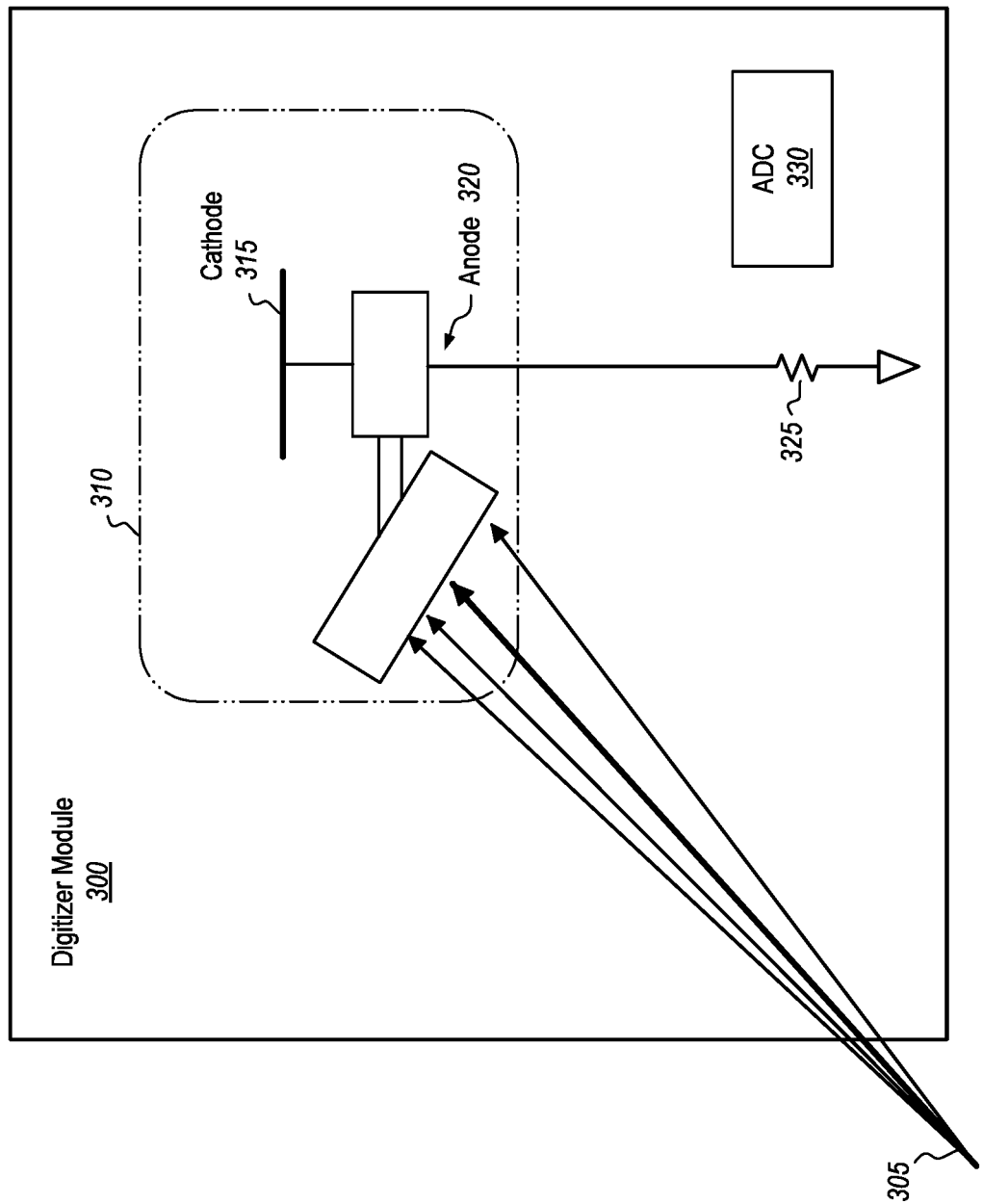
FIG. 3 illustrates an example digitizer module that uses a SiPM sensor to capture reflections that emanate off of a user's eye.

Attention is now directed to FIG. 3, which illustrates one example implementation of the digitizer module 135 of FIG. 1. As shown, the digitizer module 300 is used to capture reflected light waves 305. These reflected light waves 305 are examples of the specular and scatter reflections described in relation to FIG. 1. For instance, the reflected light waves 305 may include a specular reflection, one or more scatter reflections, or a combination of a specular reflection and one or more scatter reflections. Of note, these reflected light waves 305 were generated as a result of shining a ray of light (e.g., an infrared beam) onto the user's eye, as described earlier.

In the embodiment shown in FIG. 3, these reflected light waves 305 are captured using one or more silicon photomultiplier (SiPM) sensors, such as SiPM sensor 310. A SiPM sensor (e.g., SiPM sensor 310) is an electronic device that converts light to electricity. Specifically, a SiPM sensor is a solid-state device that is able to detect photons on an individual level. It is a photosensitive PN junction built on a silicon substrate and uses multiple microcells in the form of avalanche photodiodes that are electrically connected together in parallel. Because of the avalanche photodiodes, the SiPM is able to operate in an "avalanche mode" (and more specifically a "Geiger" mode (more detail to follow)) when capturing light (e.g., the reflections reflecting from the user's eye).

A SiPM sensor is an analog device because the output of each of the microcells is read in a parallel manner even though the device is structured to operate in a digital switching mode. SiPM sensors are particularly beneficial because they provide a high gain signal with a relatively low voltage output. Additionally, they provide a very fast response. To clarify, a SiPM sensor has a fast response regardless of a signal's intensity due to its rapid avalanche process and quenching (discussed in more detail below) of the individual microcells. This allows a SiPM sensor to run with a much higher modulation frequency and a much higher output signal than standard large area photodetectors. Additionally, because the SiPM sensor includes multiple detector microcells that fire/operate in parallel, the SiPM sensor acts as an analog device, and the total resulting photo-current is equivalent to sampling a signal (e.g., a continuous signal) at a determined frequency which is how an analog device operates. Therefore, in this manner, the SiPM sensor operates as an analog device.

Because a SiPM sensor has a high gain, the output signal of the SiPM sensor can be loaded onto a flex circuit right away as opposed to having to first pass through an additional amplifier (e.g., a trans-impedance amplifier). Because the embodiments do not require a trans-impedance amplifier to be placed right next to the SiPM sensor (though a trans-impedance amplifier may still be used, if desired), the embodiments simplify the design process and make the eye tracking system consume less power compared to the traditional approaches. As the IR laser light is transmitted through the waveguide display, the overall assembly is less noticeable to a user.

As indicated above, a photomultiplier (e.g., a SiPM) is able to operate in an "avalanche mode." Notably, an avalanche mode actually includes two different modes, one mode occurs below breakdown and the other mode occurs above breakdown. Breakdown refers to the point at which a photomultiplier's gain progresses toward infinity. In most applications, infinite gain is not actually achievable. As a result, a threshold value (often a voltage value, or a "voltage breakdown") is defined to establish when breakpoint occurs.

The mode that occurs above the breakdown is referred to as the "Geiger mode," which is the mode that the SiPM sensor typically operates in. A SiPM sensor is able to operate in the Geiger mode because it is externally biased. As discussed earlier, a SiPM sensor includes many microcells that operate in parallel. Each microcell is a combination of a series of avalanche photodiodes and a quenching resistor. Because these microcells are connected in a parallel manner, the SiPM sensor includes both a cathode (e.g., the cathode 315 shown in FIG. 3) and an anode (e.g., the anode 320). Because of the external bias, the avalanche photodiodes operate above the breakdown which causes the SiPM sensor to operate in the Geiger mode. Therefore, as a result of operating in the Geiger mode, a SiPM sensor provides a relatively high gain. Additionally, the correlation between the gain and the breakdown is generally linear.

Because the SiPM sensor operates in the Geiger mode, there is an optical gain associated with the SiPM sensor's output signal (i.e. the electrical response). This gain increases the output signal's intensity. Such an increase in the signal's intensity allows for the selection of an analog to digital converter (hereinafter "ADC") that uses less power and that is less costly to fabricate. As a result, the disclosed embodiments significantly reduce how much power is required to track a user's eye. The embodiments also significantly reduce the manufacturing costs because less complex (and therefore cheaper) ADCs can be used.

Returning to FIG. 3, this figure shows that the digitizer module 300 includes a SiPM sensor 310 as described above. Additionally, the digitizer module 300 includes a load resistor 325 and an ADC 330 that measures/samples the voltage across the load resistor 325. In other words, the ADC 330 is used to sample the electrical response of the SiPM sensor 310. Some embodiments also include one or more analog low and/or high pass filter(s) for filtering the electrical response of the SiPM sensor 310 prior to sampling the electrical response with the ADC 330. The filter(s) effectively reduce(s) the signal to noise ratio and improves the output of the ADC 330.

In this manner, the disclosed embodiments are able to convert light to an electrical response. Indeed, by measuring the specular and scatter reflections, the disclosed embodiments are able to generate the electrical response which can then be used to generate an image of the user's eye. This image captures the position of the user's eye at a specific point in time. As multiple images are generated, then the embodiments are able to track the user's eye movements by determining the delta displacement of the eye across the multiple images.

As illustrated in the Figures, some embodiments include eye tracking systems that include an infrared module (e.g., the IR laser shown in FIG. 1) and one or more SiPM sensors (e.g., the SiPM sensor 310 shown in FIG. 3). This infrared module is able to emit a light wave (e.g., a beam of photons) which, in some instances, is a subsampled infrared light wave.

This subsampled infrared light wave is directed toward a user's eye during use of the eye tracking system. For example, the subsampled infrared light wave can be directed to the user's eye through use of the waveguide 125 shown in FIG. 1. Additionally, the process of scanning a subsampled light wave may be performed at a MEMS-based scanner system that includes one or more lasers.

Furthermore, one or more SiPM sensors can be positioned relative to the infrared module and relative to the user's eye so as to capture a reflection that emanates off of the user's eye. In some instances, the reflections that are captured by the one or more SiPM sensors include a specular reflection, one or more diffuse/scatter reflections, or a combination of both a specular reflection and one or more scatter reflections, as described earlier. The one or more SiPM sensors then capture these reflections and measure them (e.g., by generating an electrical response).

Although FIG. 3 shows a scenario in which a single SiPM sensor, a single load resistor, and a single ADC are being used, the embodiments disclosed herein are not so limited. For instance, the embodiments are able to support multiple SiPM sensors, multiple load resistors, and multiple ADCs. Each ADC corresponds to one of the SiPM sensors. In this manner, a single ADC is able to sample the electrical response from a single SiPM sensor. Furthermore, this sampling can occur at a determined frequency. In some instances, the eye tracking system also includes an analog low pass filter that filters the SiPM sensor's electrical response before the ADC samples that response. Such a configuration advantageously reduces the signal to noise ratio and improves the output of the ADC.

In situations where there are multiple SiPM sensors and multiple ADCs, each ADC may sample the electrical response of its corresponding SiPM sensor at a unique/different frequency. Therefore, in some embodiments, each of the multiple ADCs samples an electrical response at a frequency that is different than the other ADCs. Alternatively, the ADCs could all sample their respective SiPM sensors at the same frequency. Accordingly, the depiction shown in FIG. 3 is for illustrative purposes only and should not be considered as limiting the scope of the claims.

Some embodiments alternatively or additionally include a PIN junction detector (hereinafter a "PIN PD"). A PIN PD is another type of light detection device. Typically, PIN PDs do not have the gain of a SiPM sensor, and detected photons are converted into electrons. For example, as the light intensity through the waveguide is measured in the uW level, and the reflected light intensity from the eye and measured by the PIN PD is in the 10-100 nW range (as the PIN PDs are removed from the eye, and the area of the PIN PD is relatively small), the corresponding output current level from the PIN PD is in the 10-100 nA range, resulting in a nA scale photo-current for scattering reflections and a µA scale for the specular (i.e. the glint) reflection. When an impedance load of 50 ohms is used (e.g., to avoid large RC circuit delays), then the PIN PD's smaller photo-current might have to be amplified 1000× for scatter reflections and 10× for the specular reflection. This amplification is performed to ensure that the resulting voltage (of the PIN PD) is larger than 1 mV so that it can be properly loaded onto a flex circuit with a typical noise profile and so that sampling by the ADC can be performed without suffering a large quantization error. Although PIN PDs have a lower gain, they are rather easy to fabricate and can be done so in a relatively cheap manner.

Figure 4:
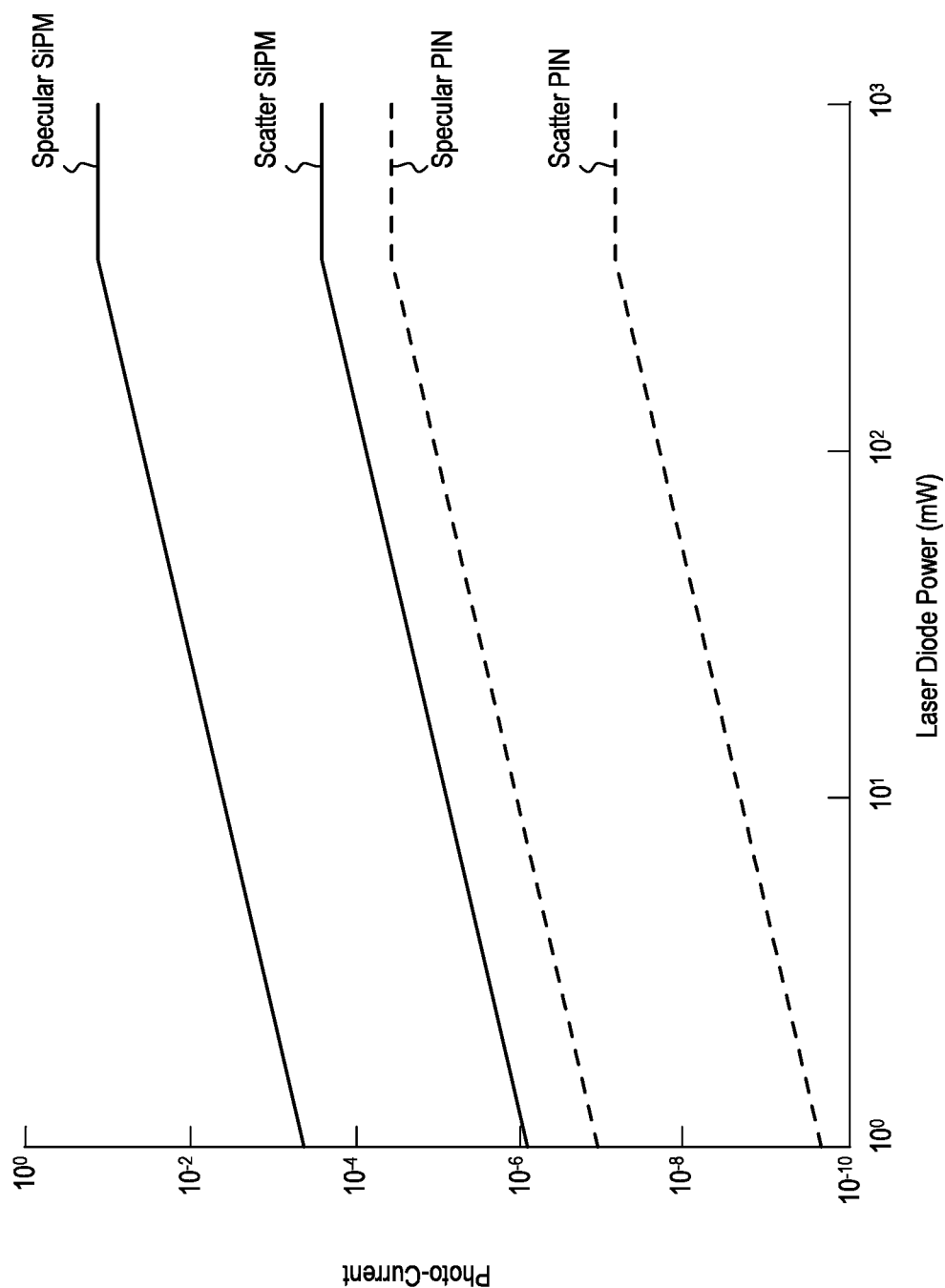
FIG. 4 presents a graphical readout that shows a photo-current correlation between a specular reflection and a scatter reflection as captured by a SiPM and a specular reflection and a scatter reflection as captured by a PIN junction photomultiplier detector.

As indicated earlier, the intensity of a scatter reflection is lower than the intensity of a specular reflection. As a result, the measured photo-current of a scatter reflection will be lower than the measured photo-current of the specular reflection. FIG. 4 provides an example illustration of this occurrence.

In particular, FIG. 4 shows a graphical representation of the measured photo-current of both a specular measurement and a scatter measurement as captured by a SiPM sensor. As indicated, the scatter measurement is lower than the specular measurement. Additionally, FIG. 4 also shows the photo-current of a specular measurement and a scatter measurement when a PIN PD is used. Here, this figure illustrates the gain differences between a SiPM sensor and a PIN PD. As shown, the gain is significantly higher for the SiPM sensor than it is for the PIN PD.

Due to the relatively low photo-current of the PIN PD, additional operational amps ("op amps") may be used to achieve the high gain bandwidth (e.g., in the 18 GHz range) to provide the roughly 60× gain in the 70 MHz range. Using an op amp has tradeoffs, however, because the quiescent power for an op amp is typically in the ~100 mW range. Further, two of these op amps are cascaded to get the 3,600× gain to adequately amplify the nA current levels of the PIN PD. Because the disclosed embodiments operate using at least some SiPM sensors, the embodiments significantly improve the battery life of the eye tracking system when compared to systems that use only PIN PDs, as generally shown by the values in Table 2.

TABLE 2

| Technology | Measured Current | Required Gain (V/V) | Frequency Range | Power Consumption Per Amplifier |
|---|---|---|---|---|
| PIN PD | 10-100 nA | 1000 | 10 kHz-130 MHz | 2x Op Amps connected in series. Total Consumed Power = 224 mW |
| SiPM | 3-30 µA | 10 | 10 MHz-130 MHz | Total Consumed Power = 10 mW |

With that understanding, some of the disclosed embodiments use a combination of SiPM sensors and PIN PDs. In these embodiments, the PIN PDs may be used to operate on/measure the specular reflection, which has a relatively higher intensity (and thus requires less gain amplification), while the SiPM sensors may be used to operate on the scatter reflections, which have relatively lower intensities. As a result, the embodiments are able to incorporate the high gain benefits of the SiPM sensors to operate on the scatter reflections and to incorporate the low cost/ease of production benefits of the PIN PDs to operate on the specular reflections.

It will be appreciated, however, that other configurations are also available. For example, some of the SiPM sensors may operate on the specular reflection and some may operate on the scatter reflections. Additionally, some of the PIN PDs may operate on the specular reflection and/or the scatter reflections. As a result, the embodiments may cause the SiPM sensors and/or the PIN PDs to operate on different types of reflections.

Figure 5:
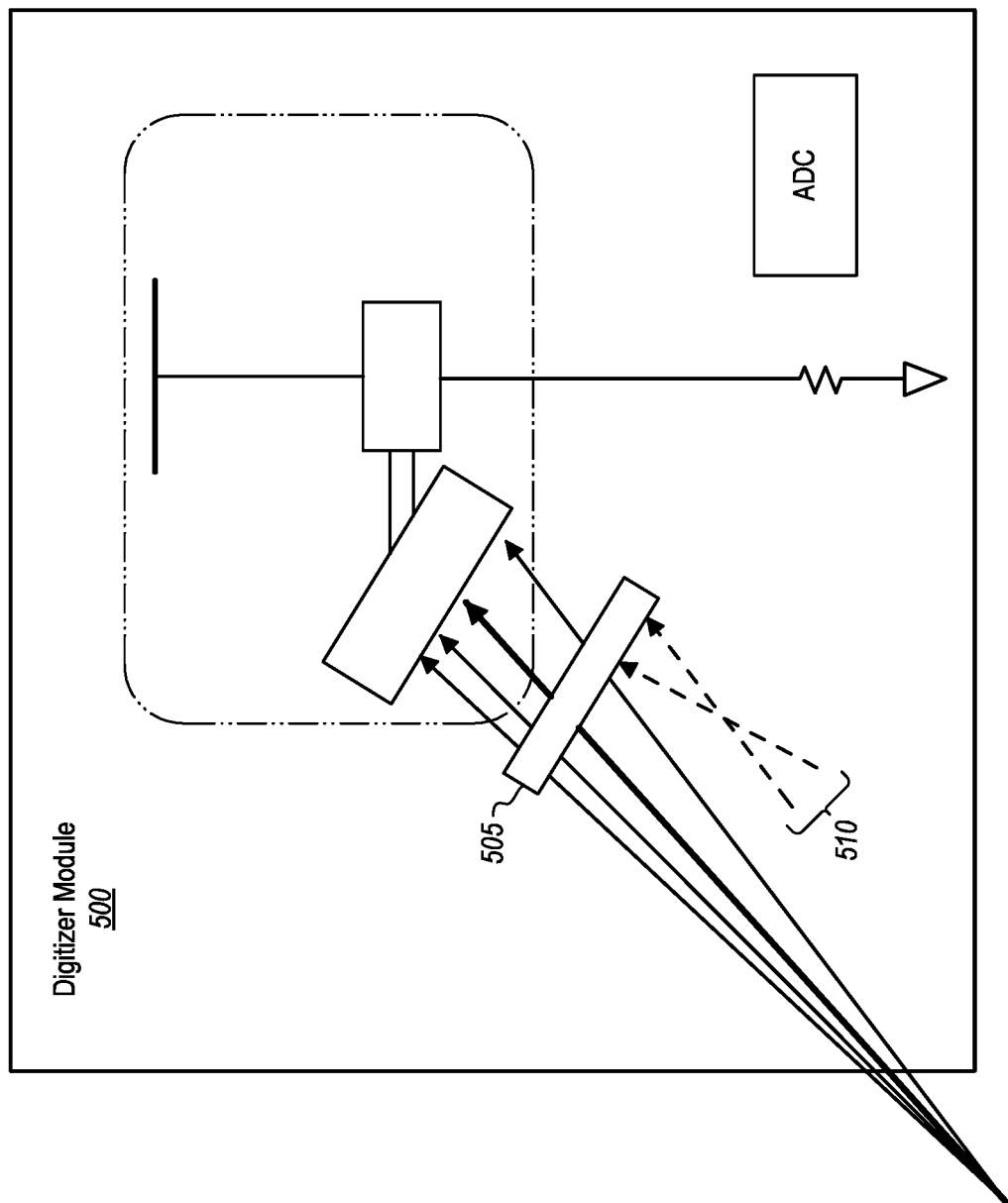
FIG. 5 illustrates another example digitizer module that uses a filter to filter out undesired ambient light and/or other types of light prior to that light reaching a SiPM sensor.

Turning now to FIG. 5, this figure illustrates another example implementation of the digitizer module 135 of FIG. 1. To illustrate, FIG. 5 shows a digitizer module 500 that includes many of the same components that were discussed in relation to the digitizer module 300 of FIG. 3. Because many of the components are the same, the common components will not be re-labeled.

In contrast to the digitizer module 300 of FIG. 3, the digitizer module 500 (which may include SiPMs and/or PIN PDs) additionally includes a filter 505. This filter can be structured to filter out light waves of different wavelengths that are different from the illumination wavelength. As a first example, the filter 505 can be used to filter out undesired ambient light 510. While the scatter and specular infrared reflections from the illumination light source (or laser) are allowed to pass through the filter 505, the undesired ambient light 510 is filtered out such that it is not able to reach the SiPM sensor. In this manner, some of the disclosed embodiments limit the amount of light waves that reach the SiPM sensor.

In addition to filtering out the undesired ambient light 510, the filter 505 may additionally or alternatively be structured to filter out other light waves. For example, the filter 505 may be structured to filter out red light, green light, and/or blue light from the scanning MEMs laser display. Additionally or alternatively, the filter 505 may be structured to filter out light waves that have other wavelengths in the visible spectrum from the ambient environment. Furthermore, the filter 505 may be structured to filter out light waves having a wavelength located within a specific portion of the infrared wavelength spectrum (or any other spectrum). Accordingly, from this disclosure, it will be appreciated that the filter 505 may be used to filter out any type of undesired light wave.

As indicated above, some embodiments include the filter 505 (e.g., an infrared filter). As shown in FIG. 5, this filter 505 is disposed at a location so that it can filter light before the light reaches the SiPM sensor.

Figure 6:
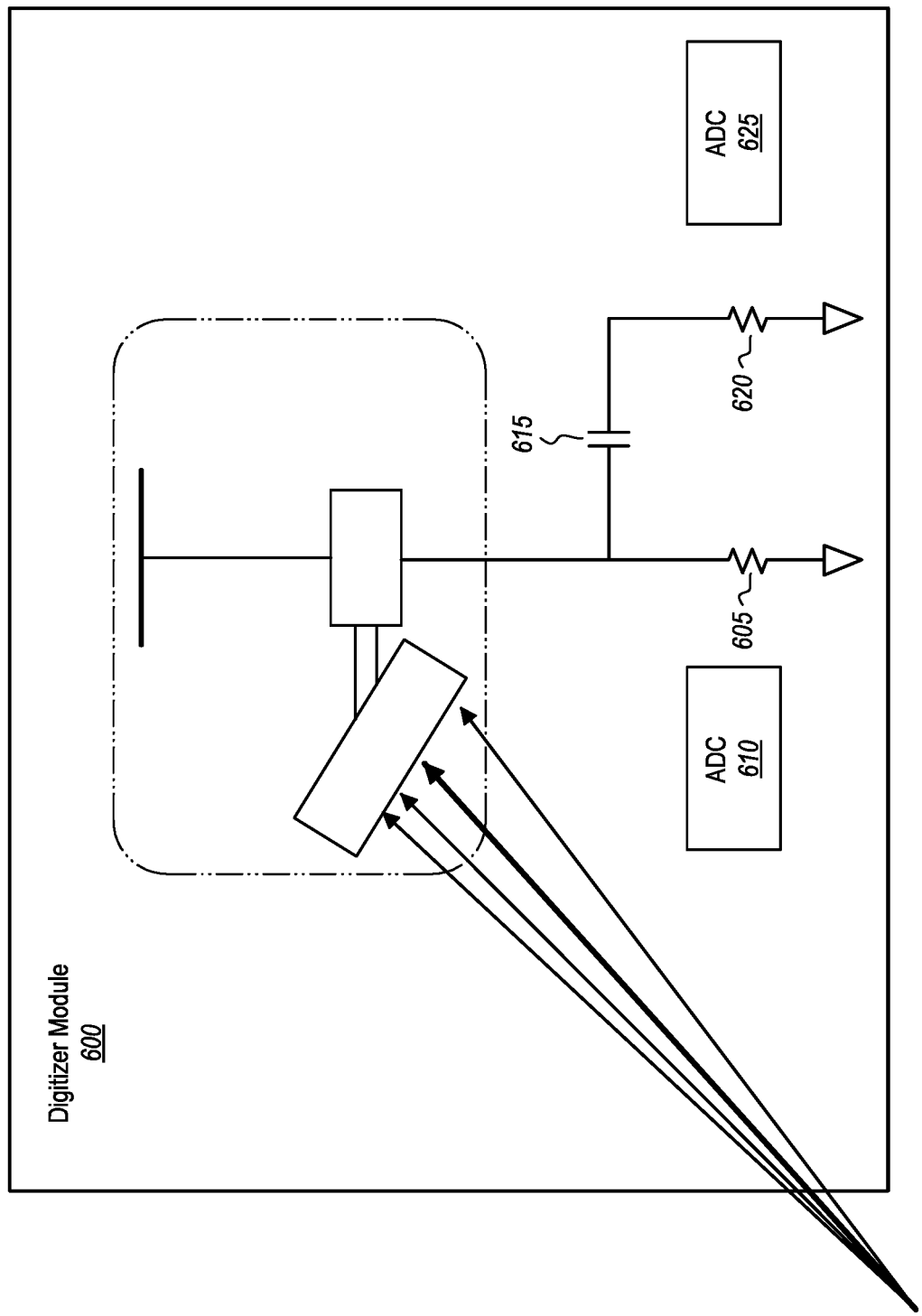
FIG. 6 illustrates another example digitizer module that uses a coupling capacitor to preferably sharpen or increase the pulse response of a SiPM sensor.

Attention will now be directed to FIG. 6, which illustrates another example implementation of a digitizer module (such as the digitizer module 135 of FIG. 1). Here, however, the digitizer module 600 includes a first load resistor 605, a first ADC 610, a coupling capacitor 615, a second load resistor 620 that is placed in parallel with the first load resistor 605, and a second ADC 625. Such a configuration is particularly beneficial when the lasers operate in a pulsed mode, which will be described in more detail later.

One advantage of a SiPM sensor is that it has a very narrow pulse response (e.g., in the range of 15 ns). This narrow pulse response is equivalent to the "quenching time" of a firing pixel. As used herein, the "quenching time" is the time needed to recharge and restore the SiPM sensor's single photon sensitivity.

Here, if the electrical response of the SiPM sensor is coupled through a small capacitor (e.g., the coupling capacitor 615), then an even narrower pulse (~1 ns) can be achieved, albeit with a similar recovery time prior to the next pulse as with the standard load resistor. With this configuration, the signal on the first load resistor 605 (as sampled by the first ADC 610) and the signal on the second load resistor 620 (as sampled by the second ADC 625) can be easily integrated and sampled, which is beneficial when pulsed laser light is detected.

Figure 7:
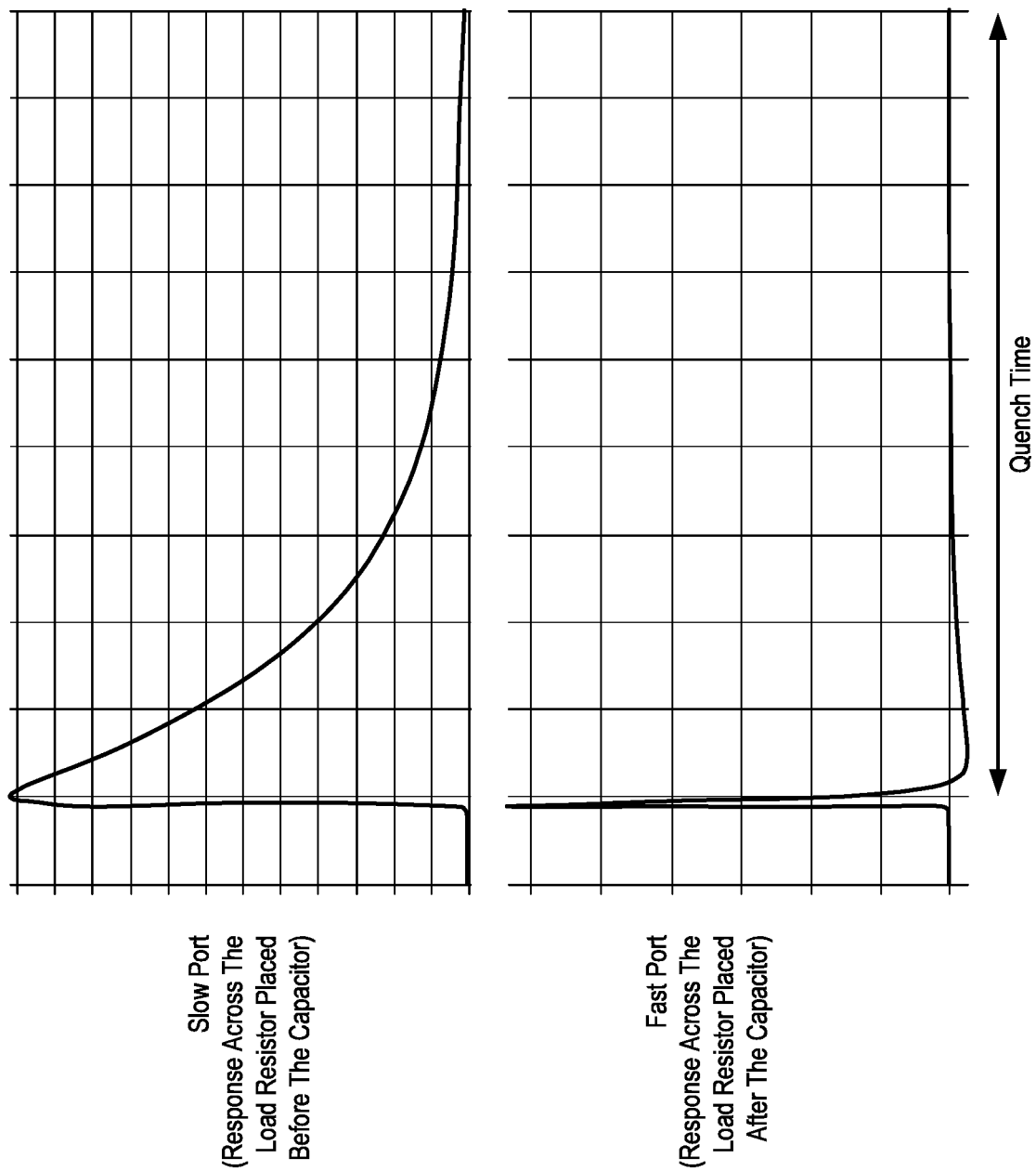
FIG. 7 shows a graphical readout showing the impact on a SiPM sensor's quench time when a coupling capacitor is used and when one is not used.

FIG. 7 shows a graphical representation of the quench times for the two load resistors (i.e. the first load resistor 605 and the second load resistor 620). Here, the top graph shows the quench time for the first load resistor 605 (i.e. the response across the load resistor placed before the coupling capacitor). The bottom graph shows the quench time for the second load resistor 620 (i.e. the response across the load resistor placed after the coupling capacitor). As described above, although the pulse for a SiPM sensor is quite fast (as shown in the top figure), the pulse will be even narrower if a coupling capacitor is used. In this manner, the time required to "reset" the SiPM sensor can be significantly reduced.

Figure 8:
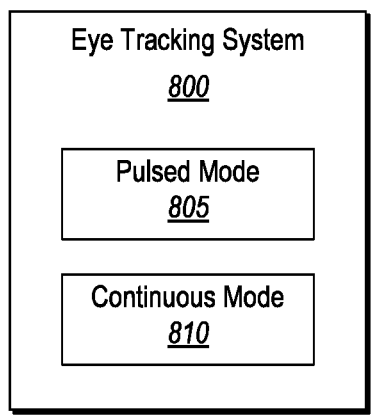
FIG. 8 demonstrates that the eye tracking system can operate when the laser module is functioning in a pulsed mode or a continuous mode.

Attention will now be focused on embodiments that are selectively operable in a pulsed mode and a continuous wave mode. With reference to FIG. 1, in some instances, the disclosed embodiments are able to adjust how the lasers 105 emit the light waves, to operate in either a pulse mode or a continuous wave mode. Accordingly, FIG. 8 shows an eye tracking system 800 that is configured to operate in either a pulsed mode 805 or a continuous wave mode 810.

Figure 9:
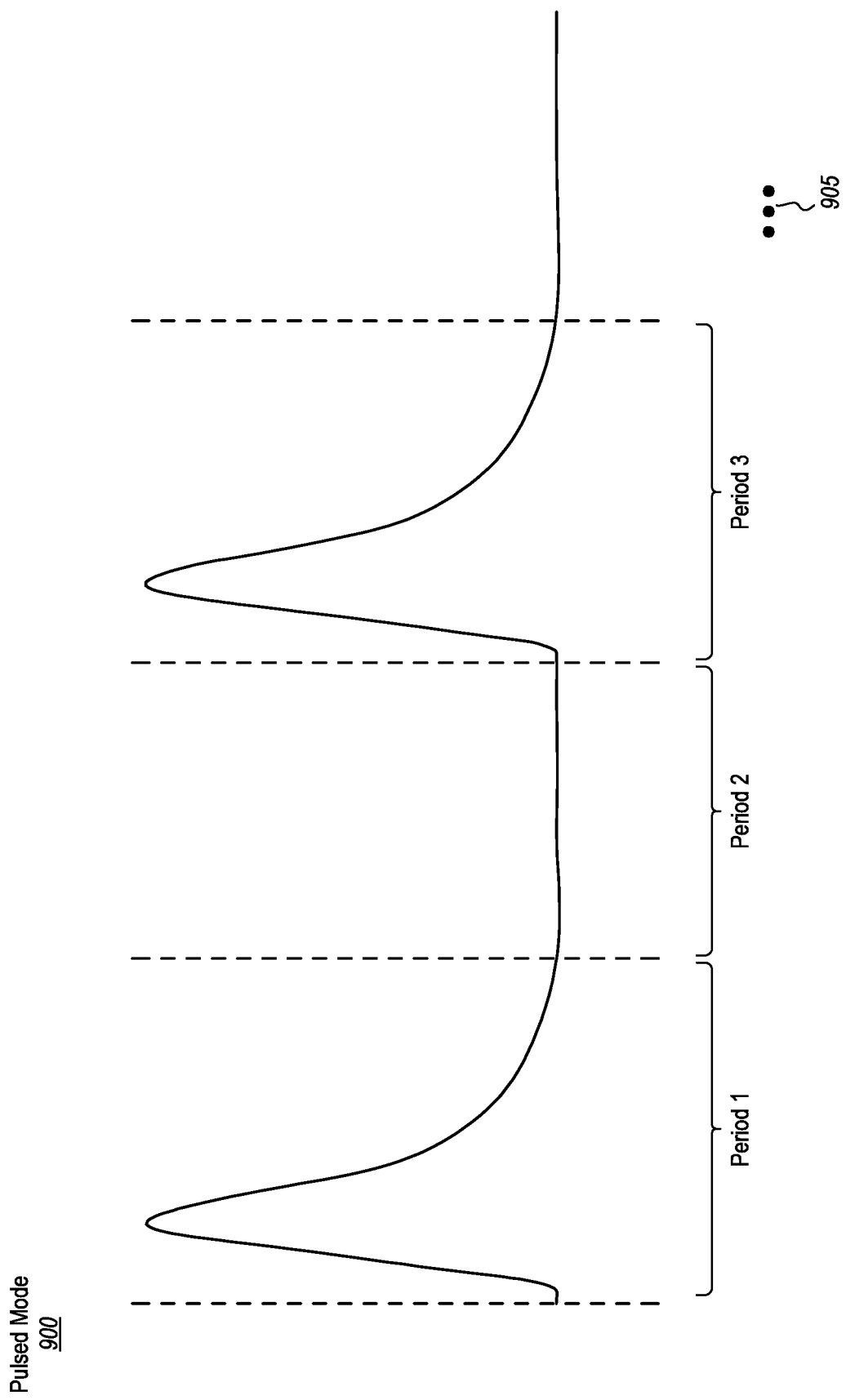
FIG. 9 shows that when the laser module is operating in the pulsed mode, then the electrical response of a SiPM sensor can be sampled in a synchronized manner.

When operating in the pulsed mode 805, the embodiments cause lasers (e.g., the lasers 105 shown in FIG. 1) to emit pulses of light waves as opposed to emitting a continuous wave. FIG. 9 shows a graphical representation of a digitizer module's electrical response when the lasers are configured to operate in the pulsed mode 805. In particular, FIG. 9 shows three time periods (Period 1, Period 2, and Period 3). The ellipses 905 demonstrates that the embodiments are able to operate across any number of time periods.

During Period 1, the lasers emit light waves, and the digitizer module is able to detect a first amplitude peak. During Period 2, the lasers do not emit light waves. As a result, the digitizer module does not detect an amplitude peak. Finally, during Period 3, the lasers again emit light waves, and the digitizer module is able to detect a second amplitude peak.

By operating a digitizer module in combination with pulsing lasers, the digitizer module is able to generate a pulsing response that corresponds to the pulse of the lasers (e.g., see the pulsing responses shown in FIG. 9). By synchronizing the laser's clock with the sampling frequency performed by the digitizer module (e.g., specifically by the ADC), the embodiments are able to obtain the intensity for the reflected light waves at a specific position. This position corresponds to where the light wave is being steered by a MEMs-based scanner. Because the digitizer module is sampling at a reduced rate (e.g., only during Periods 1 and 3 as opposed to all of the Periods), then the embodiments are able to preserve the system's battery life. Accordingly, some embodiments cause the lasers to operate in a pulsed mode and also cause the digitizer modules to be synchronized with the pulsing frequency of the lasers.

To clarify, from the above disclosure, it will be appreciated that some embodiments cause an infrared module to emit a pulsed beam of photons and cause the detector and digitizer module (which includes one or more SiPM sensors) to capture a pulsed beam reflection. In other words, because the incident beam is pulsed, so too will the reflected beam be pulsed. When operating in the pulsed mode, the embodiments sample the electrical response of the SiPM sensors using one or more ADCs. Further, the sampling frequency of the one or more ADCs is synchronized with a frequency at which the pulsed light wave is generated. In this manner the embodiments limit the bandwidth of the ADC (and, if a trans-impedance amplifier is used, then its bandwidth is also limited) to match the modulation frequency of the lasers.

Accordingly, by (1) generating a subsampled light wave, (2) operating the laser in pulsed mode so that it emits light only when actively imaging a pixel, and (3) limiting the bandwidth of the ADC (and trans-impedance amplifier) to match the modulation frequency of the laser, then the embodiments are able to reduce power consumption as much as 200 mW per SiPM sensor as compared to a pulsed approach that uses standard silicon photomultiplier detectors. Furthermore, by operating in pulsed mode with components that have a high gain, the embodiments reduce the operational requirements on the ADC. Because SiPM sensors provide this high gain, the embodiments, when operating in the pulsed mode, can utilize a narrow-band ADC (and trans-impedance amplifier, if desired) and thus improve the system's battery life.

Some implementations cause the lasers to be pulsed only for the image resolution that is needed for the application (e.g., perhaps 250×250 pixels) instead of the full resolution/FOV (field of view) for the display. Such a configuration saves power on the laser, the ADCs, and the SiPMs (because those devices can be turned off when the laser is not emitting light, thus saving power on their end as well). Furthermore, the lasers may be pulsed only for the pixel columns that are needed as opposed to all of the pixels.

Figure 16:
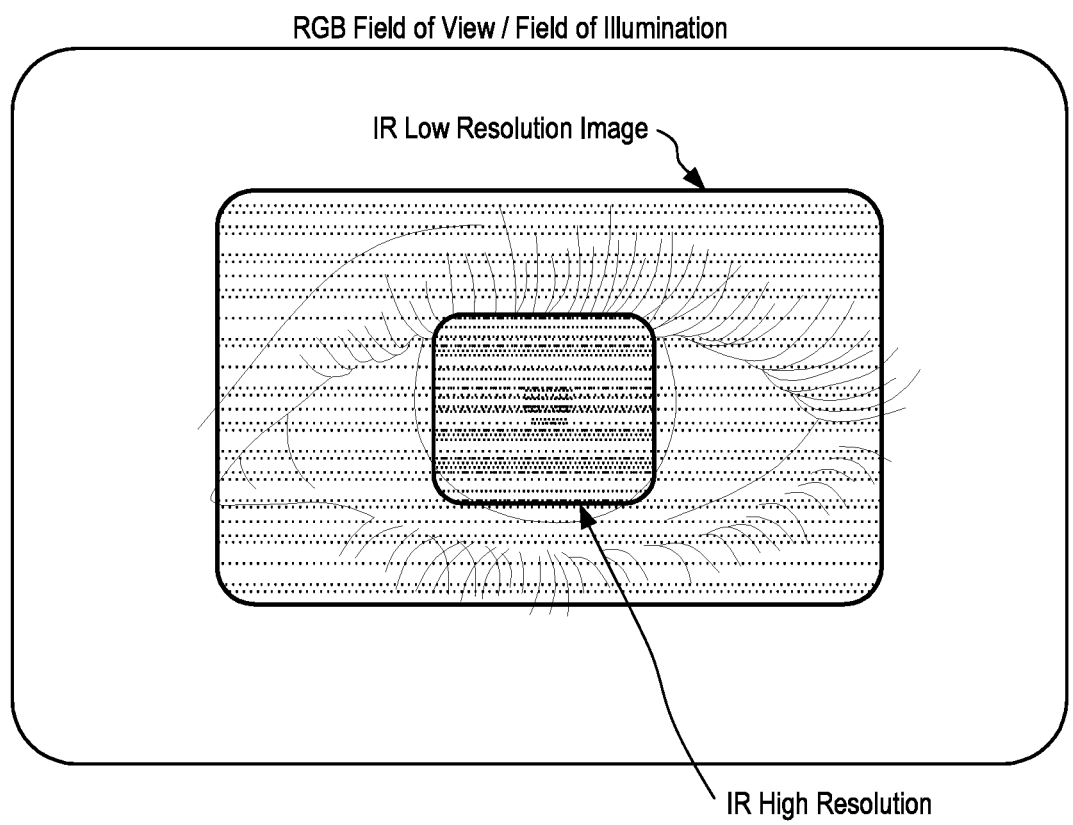
FIG. 16 illustrates an example of a FOV display in which a portion of the FOV is rendered with lower resolution and a portion of the FOV is rendered with higher resolution.

In an alternative implementation, the eye tracking system can be configured in a state that uses lower resolution and lower power techniques in a large region of the image while in other parts of the image FOV, full resolution scanning techniques are used but only for the part of the image that is of most importance (e.g., turn the laser on and oversample the SiPM output for only those important image areas) (as generally shown in FIG. 16).

In yet another implementation, when the laser is turned off or powered down during the pulsing, then the power supplies for the laser, SiPMs, and/or ADCs are also turned off or powered down. In some instances, these devices are also turned off or powered down for unneeded horizontal/vertical scanning blanking periods. By turning these devices off or powering them down, then additional power savings may be realized. Furthermore, the ADC readout and sampling may be synchronized with the laser pulses. Even further, the ADCs may be turned off (or put in a low power state) during blanking periods (e.g., vertical blanking periods).

Figure 10:
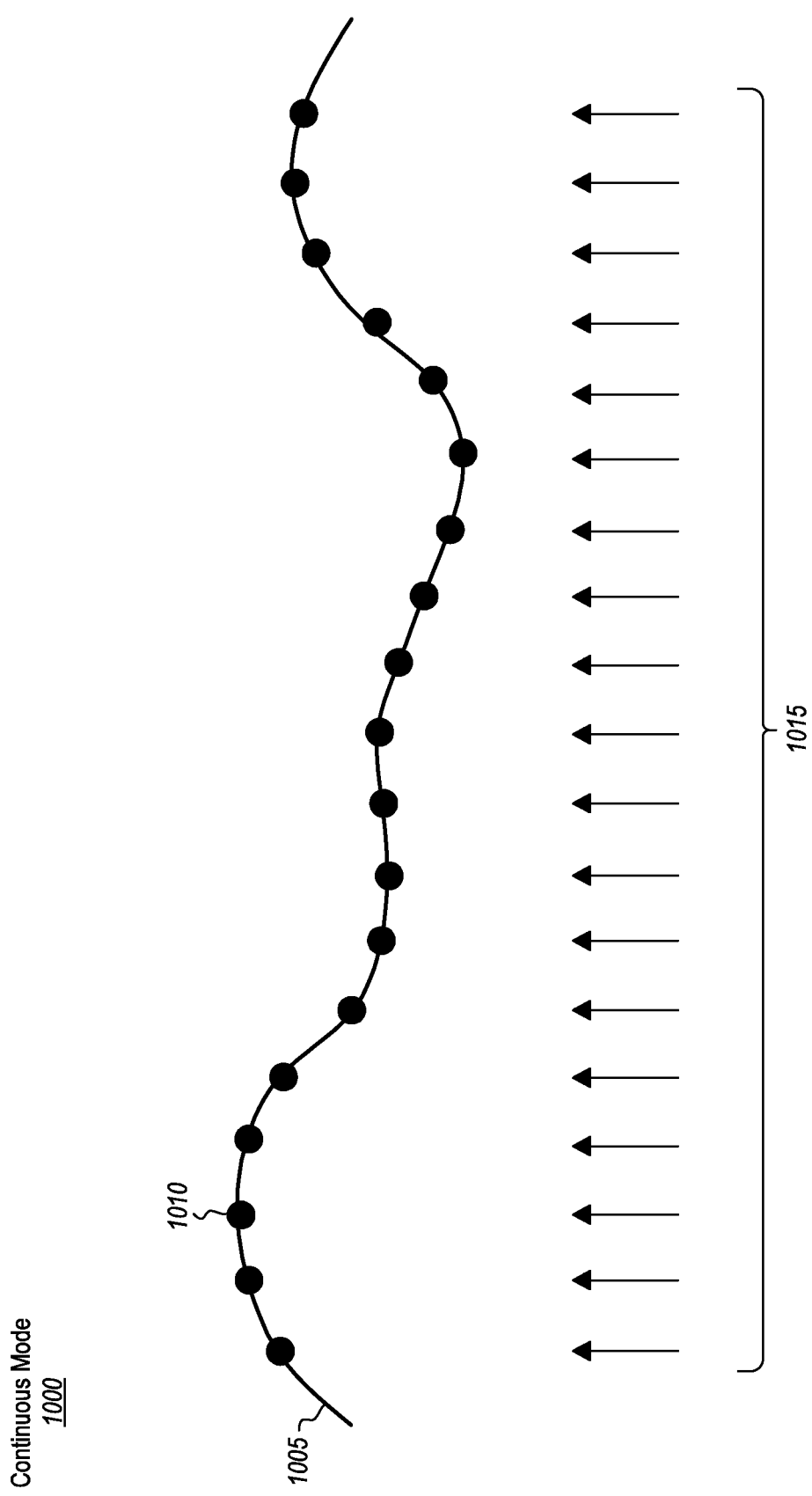
FIG. 10 shows that when the laser module is operating in the continuous mode, then the electrical response of a SiPM sensor can be sampled according to a determined frequency.

In an alternative embodiment and/or at an alternative time, the lasers may be configured to emit a continuous light wave (e.g., while operating in the continuous mode 810 illustrated in FIG. 8). As discussed earlier, a SiPM sensor operates as an analog device. As a result, the SiPM sensor is also able to operate on a continuous light wave. Such a configuration (1) improves signal levels that reduce susceptibility to electrical signal integrity issues and (2) reduces the power consumption because the SiPM sensor provides a higher intensity signal as a result of its high gain characteristics. One example operation is shown in FIG. 10.

Here, this figure shows a digitizer module operating in a continuous mode 1000. Although each firing detector cell of a SiPM sensor has a similar quenching time to that which was mentioned above, the SiPM sensor can nevertheless operate as an analog device because it uses multiple firing detector cells. This results in a device that can continuously sample a signal at a certain frequency so as to generate the smooth electrical response 1005 line. Of note, when the embodiments operate in the continuous mode 1000, the ADC sampling may be proportional to the resolution of the eye tracking camera frame. Accordingly, FIG. 10 shows an electrical response 1005 of a SiPM sensor. Here, the sampling locations are shown by the multiple dots (e.g., the dot 1010 is one sampling location). Further, the lined arrows 1015 demonstrate the sampling frequency of an ADC as it samples the electrical response 1005. For clarity, the ADC performs the sampling on the electrical response 1005.

The embodiments may also improve the signal to noise ratio to address the high frequency sampling peaks when a SiPM sensor is used as an analog device. For example, in some situations, the embodiments perform double or multiple frequency sampling on the output signal (by an ADC) from the SiPM sensor (i.e. oversampling). When the output signal is oversampled, then the embodiments can also perform a running average smooth operation to avoid high frequency noise influences. Additionally or alternatively, some embodiments (as discussed earlier) include an analog low pass filter that filters the SiPM sensor's electrical response prior to being sampled by an ADC. In this manner, the embodiments provide a high-quality signal for the ADC to sample. Accordingly, the embodiments are also able to operate in a continuous mode, as described above.

Building on that understanding, using a low pass filter to filter the eye tracking image can be achieved in a variety of ways. For example, hardware filtering may be performed in which additional hardware filters at used in conjunction with the ADC. In such a scenario, additional capacitance may be added to the input of the ADC to smooth the response of the high frequency noise as discussed earlier. Additionally or alternatively, software filtering may be performed (e.g., with a camera image signal processing unit). To illustrate, prior to the eye position calculation being performed, the embodiments are able to run an "edge preserving filter" (e.g., a joint bilateral filter) to improve the signal to noise ratio of the system. Given that the eye image has a lower image resolution, any latency should be very low and can be performed in real-time.

From the above disclosure, it will be apparent that the disclosed embodiments are able to cause a laser to emit a continuous light wave of photos that is continuous for a predetermined duration (e.g., multiple microseconds, multiple seconds, etc.). The continuous light wave may be directed so that it illuminates a person's eye. As a result of this illumination, a continuous wave reflection is also generated. Then, one or more SiPM sensors are able to capture this continuous wave reflection during use of the eye tracking system. As discussed earlier, the embodiments are able to scan a continuous subsampled light wave using the MEMs-based scanner (which includes lasers). To clarify, when the embodiments operate in continuous mode, then the continuous light wave may also be a continuous subsampled light wave.

Figure 11A:
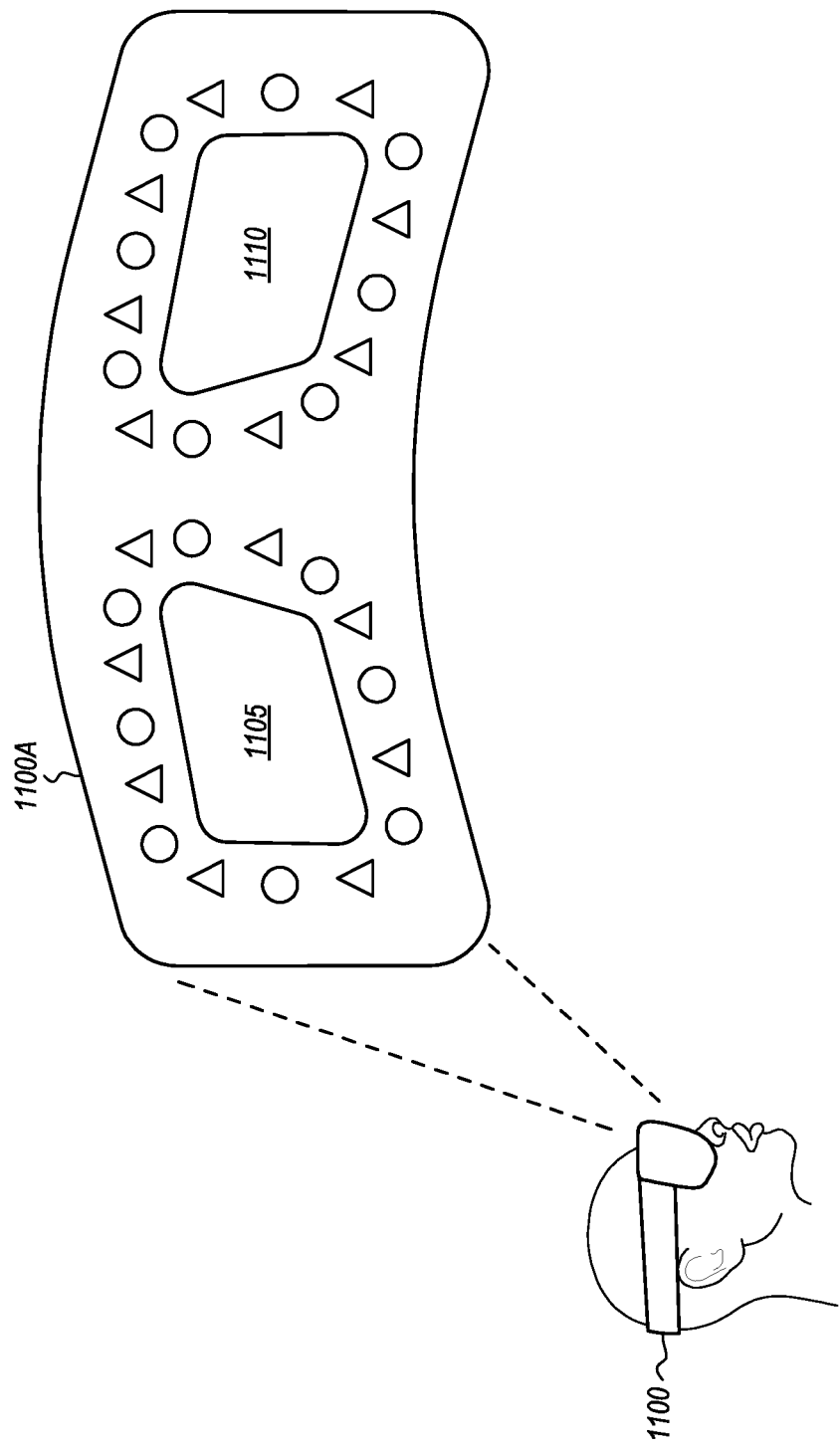
FIGS. 11A, 11B, and 11C show different example configurations of how SiPM sensors may be positioned on a HMD.
Figure 11B:
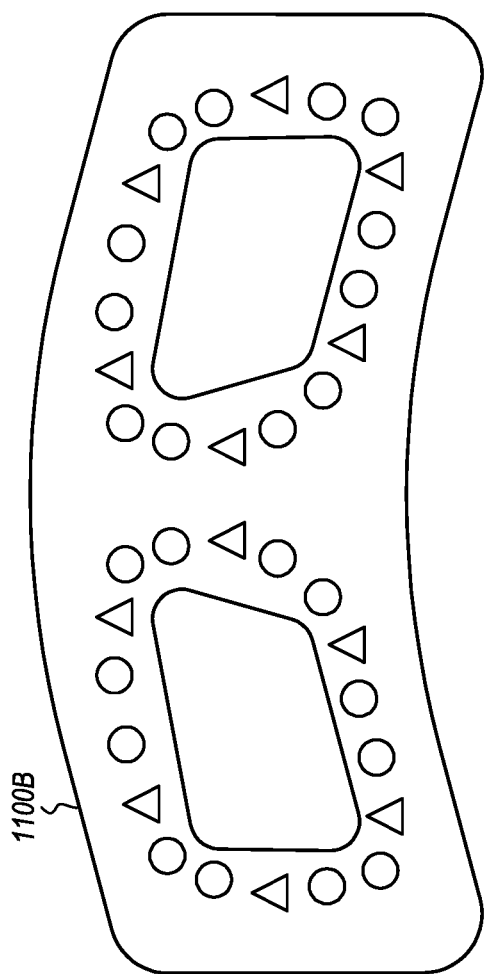
Figure 11C:
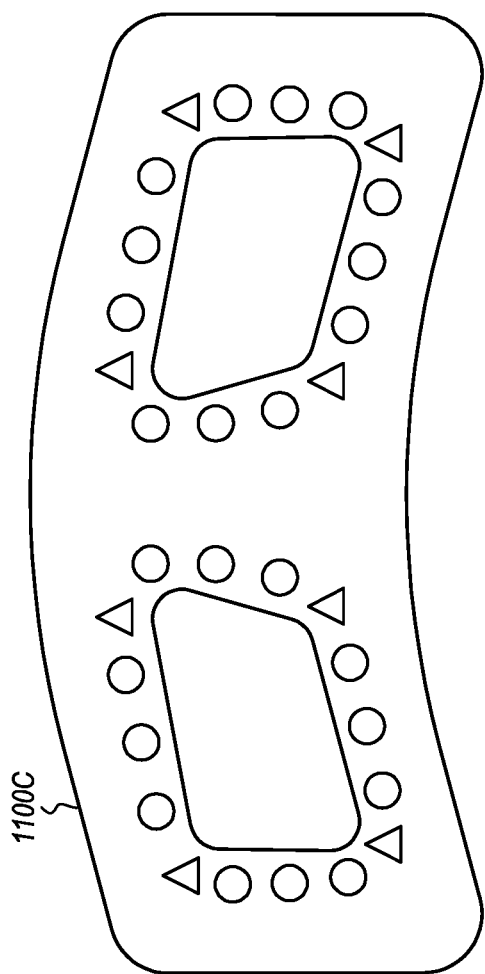

Attention will now be directed to FIGS. 11A through 11C. In particular, these figures illustrate various example configurations in which a SiPM sensor and a PIN PD may be positioned on a HMD.

Turning first to FIG. 11A, this figure shows a HMD 1100. In some instances, HMD 1100 is a system that includes a target display which has a field of view (FOV) that is visible to a user's eye during use of the HMD 1100. In some embodiments, the HMD 1100 is additionally configured to generate images that are rendered on the target display and to also image the user's eye.

FIG. 11A shows a first example implementation of an inner configuration schema for a HMD (e.g., HMD 1100A). In particular the HMD 1100A may include a left eye display 1105 and a right eye display 1110. Situated around the left eye display 1105 and the right eye display 1110 are multiple SiPM sensors that are represented by the circles. The triangles represent PIN PDs. In this example configuration, there are a total of 16 photomultipliers (8 SiPM sensors and 8 PIN PDs) that are positioned around the eye displays in a 1:1 correlation (i.e. one SiPM sensor followed by one PIN PD followed by on SiPM sensor, etc.).

FIG. 11B shows another HMD 1100B that has a different configuration. Here, the pattern of SiPM sensors to PIN PDs is 2:1, meaning that two SiPM sensors are followed by one PIN PD which is then followed by two SiPM sensors, etc.

FIG. 11C shows another HMD 1100C that has yet another configuration. Here, the pattern of SiPM sensors to PIN PDs is 3:1, meaning that three SiPM sensors are followed by one PIN PD which is then followed by three SiPM sensors, etc.

Other non-limiting configurations include patterns of 4:1, 5:1, 6:1, or any other type of configuration. Furthermore, although some of the above configurations focused on situations where there was a larger number of SiPM sensors, some embodiments may include a larger number of PIN PDs. For example, instead of 2 SiPM sensors to 1 PIN PD, some embodiments may include 2 PIN PDs for every 1 SiPM sensor. Further, some embodiments may include 3 PIN PDs for every 1 SiPM sensor. Accordingly, from this disclosure, it will be appreciated that the embodiments are able to support any configuration or pattern of SiPM sensors and PIN PDs.

Of note, the above embodiments focused on scenarios in which the eye displays were generally shaped as parallelograms. Because of this shape, the SiPM sensors and PIN PDs were also organized in a general parallelogram shape. However, other embodiments are also conceived. For example, in some situations, the SiPM sensors and the PIN PDs can be organized in an elliptical shape around the parallelogram-shaped eye displays. In other embodiments, the eye displays may have an elliptical shape, and the SiPM sensors and PIN PDs may be placed around the eye displays in an elliptical shape with respect to one another. Accordingly, the disclosed embodiments support any type of configuration for the SiPM sensors and the PIN PDs.

Even further, some embodiments include only SiPM sensors such that they do not include any PIN PDs. In these embodiments, the SiPM sensors are placed around the eye displays. Additionally, the embodiments are able to support any number of SiPM sensors and any number of PIN PDs. As a first example, an HMD may include a single SiPM sensor and zero, one, or any number of PIN PDs. Alternatively, an HMD may include two SiPM sensors and zero, one, two, or any number of PIN PDs. Alternatively, an HMD may include three SiPM sensors and zero, one, two, three, or any number of PIN PDs.

As illustrated by FIGS. 11A through 11C, the SiPM sensors and the PIN PDs are positioned around the eye displays. Because of this positioning, the SiPM sensors and the PIN PDs are placed a determined distance from a plane that corresponds to the user's eye (i.e. an "eye plane"). Of note, the distance between the photomultipliers (i.e. the SiPM sensors and the PIN PDs) and the user's eye plane may be any distance. For example, the distance may be 1 millimeter (mm), 2 mm, 3 mm, 4 mm, 5 mm, 6 mm, 7 mm, 8 mm, 9 mm, 10 mm, 11 mm, 12 mm, 13 mm, 14 mm, 15 mm, and so forth.

Accordingly, multiple SiPM sensors may be used in conjunction with each eye. Such a configuration (i.e. multiple SiPM sensors) is beneficial for at least the following reasons. First, multiple SiPM sensors allow for the detection of scatter and/or specular reflections (i.e. glints) for correct rendering of the eye plane. Additionally, multiple SiPM sensors allow for an improved collection of the reflected infrared light. This also improves the uniformity of the detection scheme. As a result, the power savings that are provided by the disclosed embodiments are particularly beneficial when multiple SiPM sensors are used.

Example Computer System

Figure 12:
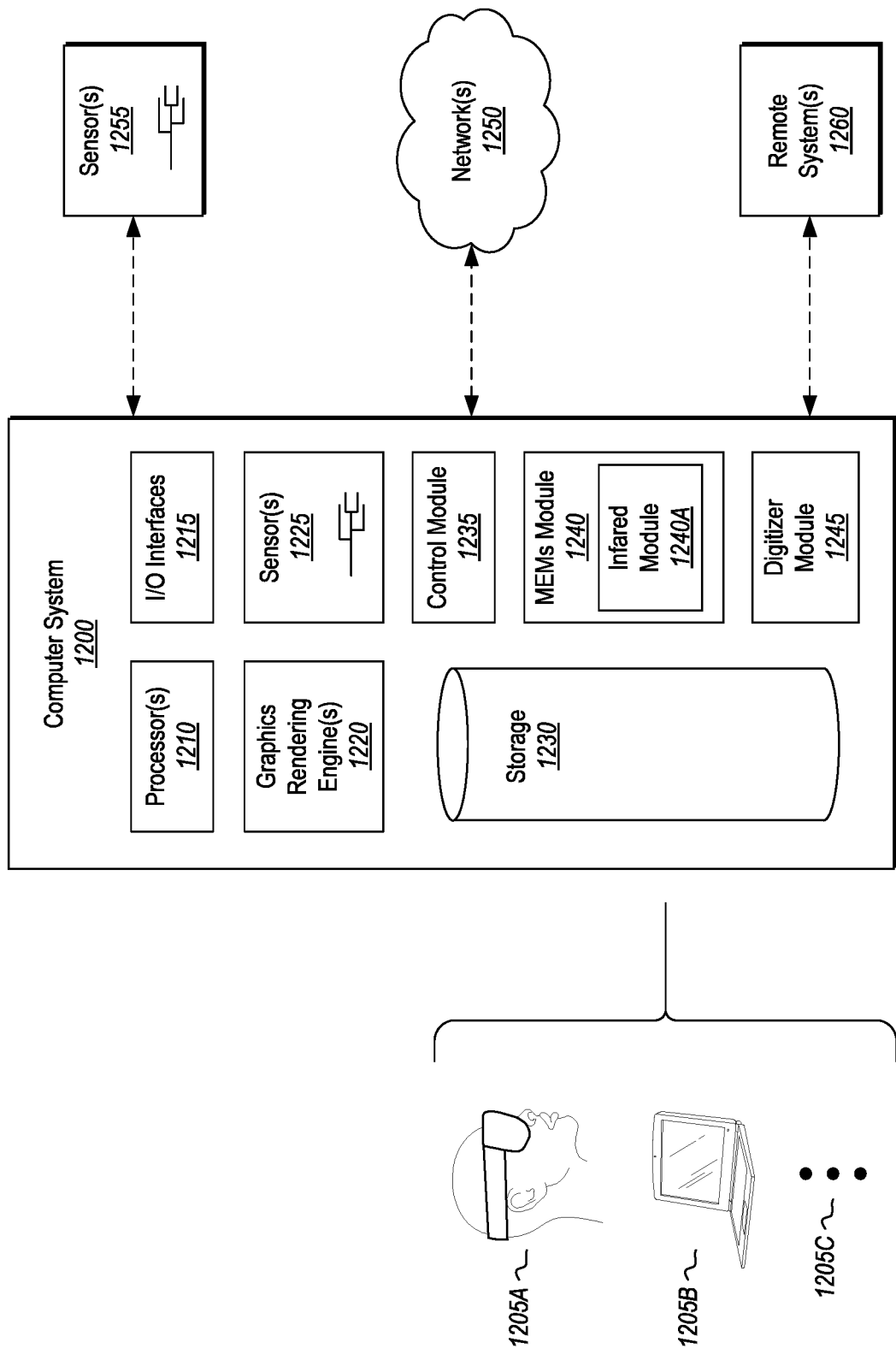
FIG. 12 illustrates an example computer system that may be used to track a user's eye movements.

Attention will now be directed to FIG. 12, which illustrates an exemplary computing system that can incorporate and/or be used with the disclosed embodiments. As used herein, "computer system," "computing system," and simply "computer" are similar terms that may be interchanged with each other. Further, the computer system 1200 may take any form. As examples only, FIG. 12 shows that the computer system 1200 may take the form of a HMD 1205A, a desktop/laptop 1205B, or any other computing form (e.g., a stand-alone or distributed computing system). Accordingly, the ellipses 1205C demonstrates that the computer system 1200 may be embodied in any form and thus it is not limited simply that which is illustrated in FIG. 12.

The computer system 1200 also includes at least one hardware processing unit 1210 (aka "processor"), input/output (I/O) interfaces 1215, graphics rendering engines 1220, one or more sensors 1225 (e.g., eye tracking sensors), and storage 1230. The computer system 1200 also includes various different components that are useful for tracking the user's eye. To illustrate, the computer system 1200 includes a control module 1235, a MEMS module 1240 which may include an infrared module 1240A, and a digitizer module 1245. More detail on these components will be discussed later.

The storage 1230 may be physical system memory, which may be volatile, non-volatile, or some combination of the two. As such, the storage 1230 may be considered a computer-readable hardware storage device that is capable of storing computer-executable instructions.

The term "memory" may also be used herein to refer to non-volatile mass storage such as physical storage media. If the computer system 1200 is distributed, the processing, memory, and/or storage capability may be distributed as well. As used herein, the term "executable module," "executable component," or even "component" can refer to software objects, routines, or methods that may be executed on the computer system 1200. The different components, modules, engines, and services described herein may be implemented as objects or processors that execute on the computer system 1200 (e.g. as separate threads).

The disclosed embodiments may comprise or utilize a special-purpose or general-purpose computer including computer hardware, such as, for example, one or more processors (such as hardware processing unit 1210) and system memory (such as storage 1230), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 1200 may also be connected (via a wired or wireless connection) to external sensors 1255 (e.g., one or more remote cameras, accelerometers, gyroscopes, acoustic sensors, magnetometers, etc.). Further, the computer system 1200 may also be connected through one or more wired or wireless networks 1250 to remote systems(s) 1260 that are configured to perform any of the processing described with regard to computer system 1200.

During use, a user of the computer system 1200 is able to perceive information (e.g., a mixed-reality scene) that is scanned by the MEMs module 1240 or that is presented on a display included among the I/O interface(s) 1215. The I/O interface(s) 1215 and sensors 1225/1255 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in a mixed-reality scene.

In some instances, the positioning and movement of the user and the objects (both virtual and actual) are continuously monitored. This monitoring specifically detects any variation in the position and the movement of the objects, such as a detected change in position, velocity, orientation, or acceleration. These movements can be absolute movements and/or relative movements, such as compared to a relative positioning of the HMD, and such that movements/positioning of the HMD will be calculated into the relative movements/positioning of the objects as they are presented in the scene.

The graphics rendering engine 1220 is configured, with the hardware processing unit 1210, to render one or more virtual objects within the scene. As a result, the virtual objects accurately move in response to a movement of the user and/or in response to user input as the user interacts with the virtual objects.

A "network," like the network 1250 shown in FIG. 12, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 1200 will include one or more communication channels (e.g., TCP ports, UDP ports, etc.) that are used to communicate with the network 1250. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components. For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

As discussed above, computer systems are able to provide a broad variety of different functions. According to the disclosed principles, the embodiments provide further functionalities related to providing a low resolution and low power MEMs-based eye tracking system with a silicon photomultiplier (SiPM) sensor. Accordingly, attention will now be directed to FIG. 13 which illustrates an example method for performing eye tracking.

Example Method(s)

Figure 13:
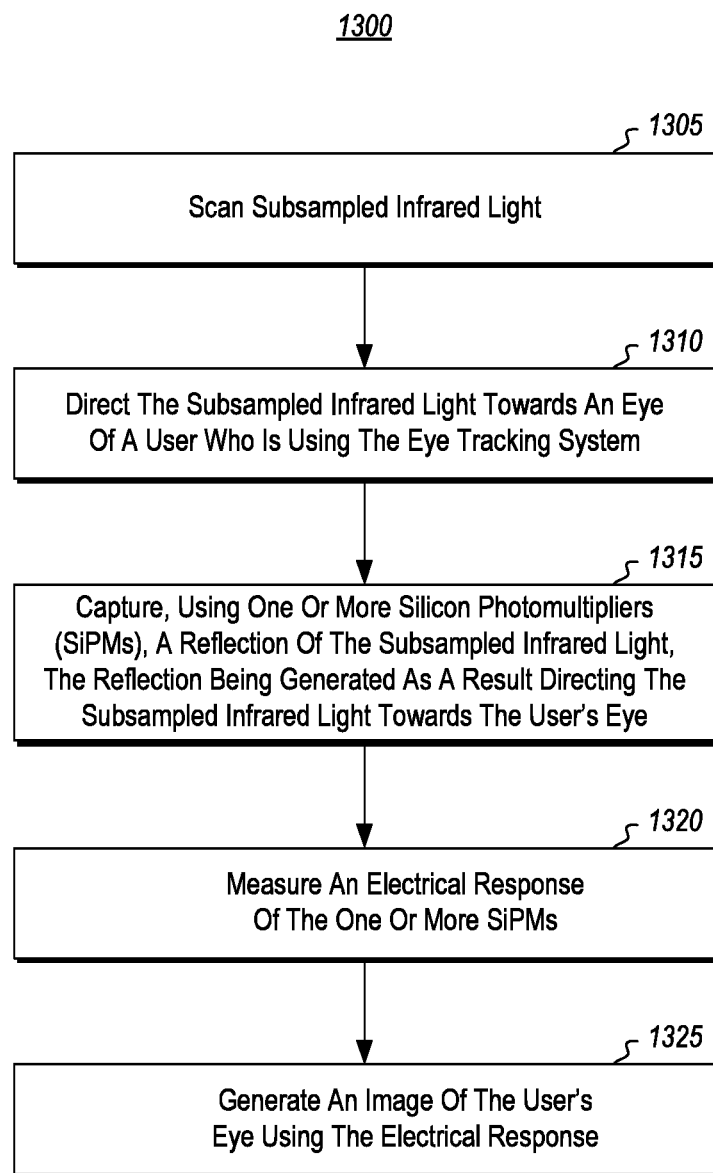
FIG. 13 provides an example method for tracking a user's eye movements.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. These methods are implemented by one or more processors of a computer system (e.g., the computer system 1200 of FIG. 12). By way of example, a computer system includes one or more computer-readable hardware storage media that store computer-executable code. This computer-executable code is executable by the one or more processors to cause the computer system to perform these methods FIG. 13 illustrates an example method 1300 for generating an image of an eye of a user. Of note, method 1300 may be performed by the computer system 1200 shown in FIG. 12.

As shown, subsampled infrared light is initially scanned (act 1305). Here, the MEMs module 1240, which includes the infrared module 1240A, may be used to generate and scan the subsampled infrared light.

Next, the subsampled infrared light is directed towards an eye of a user who is using the eye tracking system (act 1310). Here, this act may be performed by the control module 1235.

Subsequently, a reflection of the subsampled infrared light is captured using one or more silicon photomultipliers (SiPM) (act 1315). Notably, the reflection is generated as a result of the subsampled infrared light being directed towards the user's eye. This act may be performed by the digitizer module 1245.

Thereafter, an electrical response of the one or more SiPMs is measured (act 1320). This act may also be performed by the digitizer module 1245.

Finally, an image of the user's eye is generated using the electrical response (act 1325). In some instances, this act is performed by the control module 1235 shown in FIG. 12. By generating multiple images, the embodiments are able to track the movement of the user's eye across a time period.

Other methods within the scope of this disclosure include methods for performing iris authentication by generating an iris pattern based on the scatter reflections from a particular user's eye and mapping the generated iris pattern to stored iris patterns associated with authenticated users, which are stored locally or remotely. Then, upon finding a match, authenticating the user or, alternatively, upon failing to find a match, refraining from authenticating the user.

Figure 14:
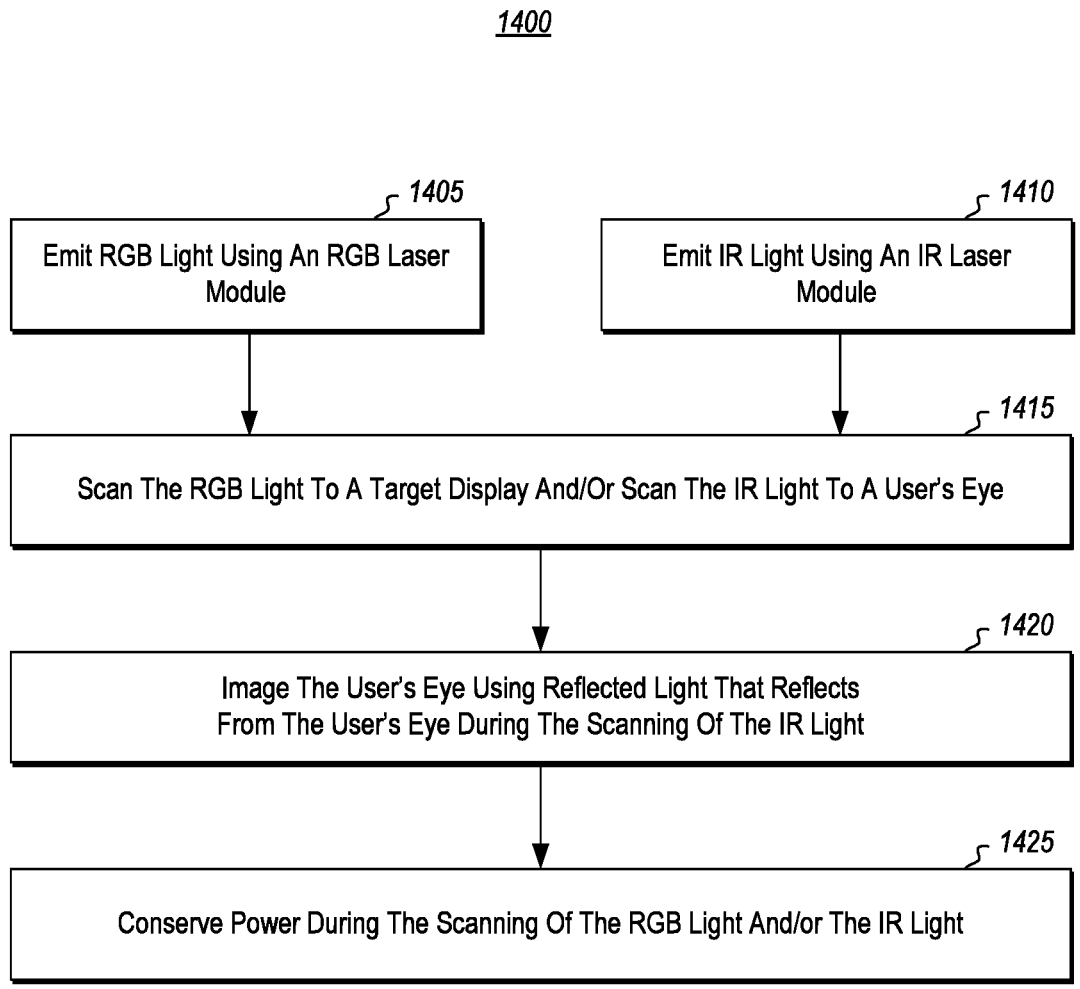
FIG. 14 provides an example method for conserving power through the use of an IR eye tracking system.

Turning now to FIG. 14, an example method 1400 is illustrated for conserving power through the use of an IR eye tracking system (e.g., perhaps the eye tracker 100 from FIG. 1 or the HMD 1100 shown in FIG. 11A) that may be incorporated into a visible light display. Here, it will be appreciated that the IR eye tracking system may be included within a HMD, or it may be a system that is distinct and independent from a HMD. Advantages of such a process include, but are not limited to, (1) a laser that operates at a lower resolution, (2) a laser that is pulsed, thus periodically operating in a low or no power state, and (3) a system that includes an eye tracking IR illuminator and IR detectors that operate in combination with high resolution/low resolution modes. Regarding this third feature, these modes may be a subset of the RGB display area (as generally shown in FIG. 16). Additionally, some embodiments use the eye tracking information to adjust/track the region of the eye image position.

As shown in FIG. 14, an RGB laser module (e.g., lasers 105A, 105B, and 105C shown in FIG. 1) is used to emit RGB light (act 1405). Either in parallel with the emission of the RGB light or after the emission of the RGB light, a IR laser module (e.g., IR laser shown in FIG. 1) is used to emit IR light (act 1410). FIG. 14 shows acts 1405 and 1410 next to each other to illustrate the fact that these two acts are not temporally dependent on each other. Furthermore, act 1410 may be performed without act 1405 being performed.

Next, a scanning system (e.g., MEMs-based scanner 120 from FIG. 1) is used to scan the RGB light to a target display or object (e.g., perhaps object/eye 130 shown in FIG. 1) and to scan the IR light to a user's eye (act 1415). Following that process, an eye tracking sensor (e.g., digitizer module 135 from FIG. 1) images the user's eye using reflected light that is reflected from the user's eye during the scanning of the IR light (act 1420). Next, the eye tracking system (e.g., eye tracker 100 from FIG. 1) is caused to conserve its power during the scanning of the RGB light and/or the IR light (act 1425).

Figure 15:
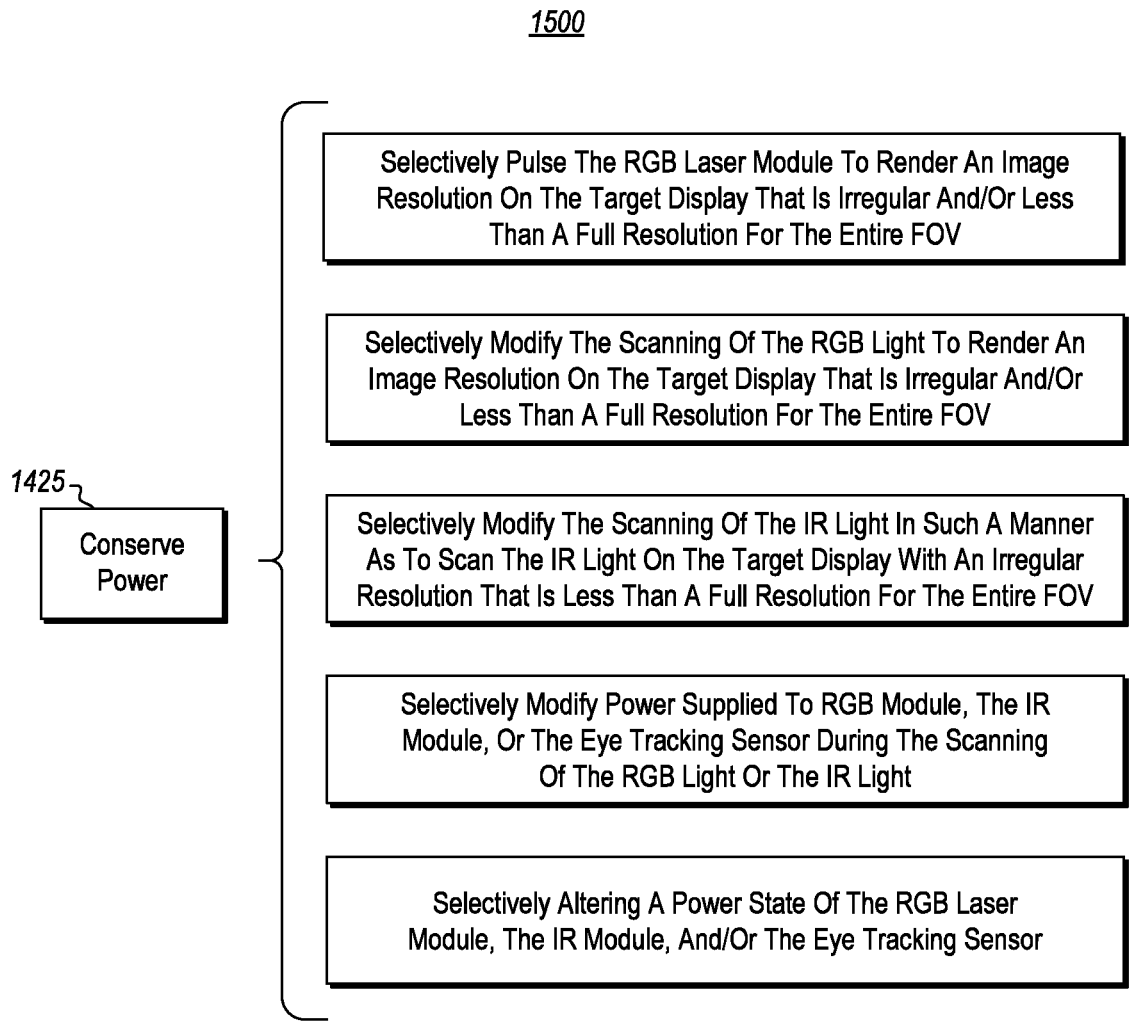
FIG. 15 provides additional examples of techniques for performing the conservation of power described in the example method of FIG. 14.

Turning now to FIG. 15, additional details are provided regarding the conservation of power described in act 1425. In particular, conserving the power may be achieved in a variety of ways, as shown in FIG. 15. Of note, the processes outlined in FIG. 15 may be performed individually or in combination with any of the other described processes. As such, there is no required dependence between these illustrated processes.

As shown, the process of conserving power (i.e. act 1425 from FIG. 14) may include any of the following. First, power may be conserved by selectively pulsing the RGB laser module (e.g., lasers 105A, 105B, and 105C from FIG. 1) to render an image resolution on the target display (e.g., perhaps the object/eye 130 from FIG. 1) that is irregular and/or less than a full resolution for the entire field of view (FOV). Second, power may be conserved by selectively modifying the scanning of the RGB light to render an image resolution on the target display that is irregular and/or less than a full resolution for the entire FOV. Third, power may be conserved by modifying the scanning of the IR light in such a manner as to scan the IR light on the target display with an irregular resolution that is less than a full resolution for the entire FOV. Fourth, power may be conserved by selectively modifying power supplied to the RGB module, the IR module, or the eye tracking sensor (e.g., the digitizer module 135 from FIG. 1) during the scanning of the RGB light or the IR light. Fifth, power may be conserved by selectively altering a power state of the RGB laser module, the IR module (e.g., the IR laser from FIG. 1), and/or the eye tracking sensor. In this manner, the disclosed principles may be performed to provide a low power eye tracking system.

In addition to the method described above, a head mounted display (HMD) system (e.g., HMD 1100 from FIG. 11A) may also be provided. Here, the HMD system may include a target display having a field of view (FOV) that is visible to a user's eye during use of the HMD system. This HMD system may be configured to generate images that are rendered on the target display and to also image the user's eye. In some instances, this HMD system may be implemented as an IR eye tracking system. In such a scenario, the IR eye tracking system may be used with a visible light display device having a target display with a FOV that is visible to a user's eye during use of the visible light display device.

This HMD system may comprise an RGB (red, green, blue) laser module (e.g., lasers 105A, 105B, and 105C from FIG. 1) that emits RGB light. The system may also include an IR (infrared) module (e.g., IR laser from FIG. 1) that emits IR light. Additionally, the system may include a scanning system (e.g., MEMs-based scanner 120 from FIG. 1) that may perform one or more of (a) scanning of the RGB light to the target display or (b) scanning of the IR light to the user's eye. In some instances, scanning the IR light may be performed on a limited portion of the target display. Further, at least some of the IR light will be reflected to the user's eye.

Even further, the system may include an eye tracking sensor (e.g., the digitizer module 135) that images the user's eye with reflected light that reflects from the user's eye during the scanning of the IR light. The sensor may include one or more sensors (e.g., SiPMs) that generate an electrical response corresponding to the reflected light. Additionally, the system may include a control module that conserves energy during the scanning of either the RGB light or the IR light by performing any of the processes outlined in FIG. 15.

In some instances, the one or more sensors described above may include one or more SiPMs. Further, the system may also include an ADC for each of the one or more SiPMs. Each of these ADCs may be configured to sample an electrical response for a corresponding one SiPM as described in some of the earlier figures. Additionally, the control module described above may be further configured to selectively modify power supplied to the one or more SiPMs and/or the ADCs during the scanning process.

In some instances, the control module conserves energy during the scanning of the RGB light by selectively pulsing the RGB laser module to render the image resolution on the target display. Additionally, some embodiments also pulse the IR module. When such pulsing occurs, this pulsing may cause either the RGB laser module or the IR module to pulse at a pulse rate that is determined to generate an image having pre-determined image resolution.

Additional power saving benefits may be achieved by pulsing either the IR laser and/or the RGB laser for only a subset of pixels as opposed to all (or a full array) of the pixels. With regard to saving power by selectively modifying the power supplied to the eye tracking sensor, this may be achieved by either power down the sensor's power supply or temporarily turning off the power supply.

To facilitate the generation of a lower resolution image, some embodiments cause the scanning system to scan the IR light to only one or more selected sub-portions of the target display's FOV while refraining from scanning the IR light to other sub-portions of the target display's FOV. Such a scenario is illustrated in FIG. 16 (e.g., foveated scanning/rendering). As such, the scanning system is able to scan different resolutions of RGB light and/or IR light to different portions of the target display's FOV.

By practicing the principles disclosed herein, significant advantages may be realized. For instance, as a result of imaging the user's eye, the IR eye tracking system is able to determine an optical axis of the user's eye (i.e. where the user is focusing his/her eyes). By imaging the user's eye, a resolution of the target display image (which may be created by the RGB light) may be adjusted in accordance with the determined optical axis. In this manner, imaging the user's eye helps facilitate the performance of foveated rendering.

Accordingly, the disclosed embodiments provide novel architectures and methods for tracking a user's eye movements and for performing iris authentication. In some embodiments, the eye tracking system includes an infrared module (e.g., as a part of a MEMs-based scanner) and one or more SiPM sensors. Together, these components operate to track a user's eye movements by measuring a reflection that emanates off of a user's eye. This reflection is measured using at least a SiPM sensor. As a result, the embodiments are able to generate an image of the user's eye using this measurement. In this manner, the embodiments are able to track the user's eye movements in a manner that requires a low resolution eye image and that significantly reduces the amount of consumed power.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An IR (Infrared) eye tracking system for use in a visible light display device having a target display with a field of view (FOV) that is visible to a user's eye during use of the visible light display device, the IR eye tracking system comprising:

an IR (Infrared) laser module that emits IR light;

an RGB (Red, Green, Blue) light module that emits RGB light;

a scanning system that performs (a) scanning of the RGB light to the target display and (b) scanning of the IR light to the user's eye;

an eye tracking sensor that images the user's eye with reflected light that reflects from the user's eye during the scanning of the IR light, the eye tracking sensor including one or more sensor(s) that generate an electrical response by periodically sampling the reflected light in accordance with a first frequency; and a control module that conserves energy during the scanning of the IR light and the RGB light by at least causing the IR laser module to emit the IR light in pulses in accordance with a second frequency that is required to correspond to the first frequency such that the sampling of the eye tracking sensor corresponds to the emitting of the IR laser module.

2. The eye tracking system of claim 1, wherein the one or more sensor(s) include one or more SiPMs (silicon photomultipliers), and wherein the eye tracking system further comprises:

an ADC (Analog to Digital Converter) for each of the one or more SiPMs, each ADC being configured to sample an electrical response for a corresponding one SiPM, and wherein the control module is further configured to selectively modify power supplied to the one or more SiPMs and the ADC for each of the one or more SiPMs during the scanning.

3. The eye tracking system of claim 1, wherein the eye tracking system further includes a bandpass filter that filters ambient visible light and a first portion of the IR light, and that transmits at least a second portion of the IR light.

4. The eye tracking system of claim 1, wherein the eye tracking system further includes an analog low pass filter that filters the electrical response of the one or more sensor(s).

5. The eye tracking system of claim 1, wherein the eye tracking system further includes a waveguide that guides the IR light to the user's eye.

6. The eye tracking system of claim 1, wherein the control module conserves energy during the scanning of the IR light by selectively operating the IR laser module to render an image having a particular resolution.

7. The eye tracking system of claim 1, wherein the control module further conserves energy by selectively modifying power supplied to the eye tracking sensor during the scanning of the IR light.

8. The eye tracking system of claim 1, wherein the control module additionally conserves energy by pulsing the IR module while also pulsing the RGB laser module.

9. The eye tracking system of claim 1, wherein emitting the IR light includes emitting the IR light at a pulse rate that is determined to generate an image having a pre-determined image resolution.

10. The eye tracking system of claim 1, wherein emitting the IR light and the RGB light includes emitting the IR light and the RGB light for only a subset of pixels as opposed to all pixels.

11. The eye tracking system of claim 1, wherein the control module conserves energy by selectively modifying power supplied to the eye tracking sensor, and wherein modifying the power includes powering down a power supply for at least one of silicon photomultiplier (SiPM) or a p-i-n (PIN) type junction detector incorporated with the eye tracking sensor.

12. The eye tracking system of claim 1, wherein the control module conserves energy by selectively modifying power supplied to the eye tracking sensor, and wherein modifying the power includes temporarily turning off a power supply for the eye tracking sensor.

13. The eye tracking system of claim 1, wherein the eye tracking system filters the electrical response of the one or more sensor(s), and wherein filtering the electrical response is performed by at least one of the following: a hardware filter or a software filter that uses a camera image signal processing unit that runs an edge preserving filter.

14. The eye tracking system of claim 1, wherein the eye tracking system is incorporated into the visible light display device, and wherein the visible light display device includes the RGB light module that emits the RGB light that is rendered on the target display, and wherein the method includes scanning the RGB light onto the target display with foveated scanning.

15. The eye tracking system of claim 1, wherein the eye tracking sensor includes one or more SiPMs (silicon photomultipliers) and one or more p-i-n (PIN) type junction detectors.

16. An IR (Infrared) eye tracking system for use in a visible light display device having a target display with a field of view (FOV) that is visible to a user's eye during use of the visible light display device, the IR eye tracking system comprising:
  an IR (Infrared) module that emits IR light;
  an RGB (Red, Green, Blue) light module that emits RGB light;
  a scanning system that performs scanning of the IR light to a limited portion of the target display, at least some of the IR light being reflected to the user's eye;
  an eye tracking sensor that images the user's eye with reflected light that reflects from the user's eye during the scanning of the IR light, the eye tracking sensor including one or more sensor(s) that generate an electrical response by periodically sampling the reflected light in accordance with a first frequency; and
  a control module that conserves energy during the scanning of the IR light by at least causing the IR module to emit the IR light in pulses in accordance with a second frequency that is required to correspond to the first frequency such that the sampling performed by the eye tracking sensor corresponds to the emitting performed by the IR module; and
  modifying the scanning of the IR light in such a manner as to scan the IR light on the target display with an irregular resolution that is less than a full resolution for the entire FOV.

17. The IR eye tracking system of claim 16, wherein the scanning system scans the IR light to only one or more selected sub-portions of the target display's FOV while refraining from scanning the IR light to other sub-portions of the target display's FOV.

18. The IR eye tracking system of claim 16, wherein the scanning system scans different resolutions of IR light to different portions of the target display's FOV.

19. The IR eye tracking system of claim 16, wherein, as a result of imaging the user's eye, the IR eye tracking system determines an optical axis of the user's eye, and wherein a resolution of a target display image is adjusted in accordance with the determined optical axis, whereby the imaging of the user's eye is used to perform foveated rendering.

* * * * *